US011373138B2

(12) United States Patent
Barr et al.

(10) Patent No.: US 11,373,138 B2
(45) Date of Patent: Jun. 28, 2022

(54) LOCATION-SPECIFIC OPTIMIZED IN-STORE CARTONIZATION

(71) Applicant: Target Brands, Inc., Minneapolis, MN (US)

(72) Inventors: Hilary Barr, Minneapolis, MN (US); Kristofer Hjelmeland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 58 days.

(21) Appl. No.: 16/696,147

(22) Filed: Nov. 26, 2019

(65) Prior Publication Data
US 2021/0158272 A1    May 27, 2021

(51) Int. Cl.
*G06Q 10/08* (2012.01)
*G06Q 30/06* (2012.01)

(52) U.S. Cl.
CPC ....... *G06Q 10/087* (2013.01); *G06Q 10/0833* (2013.01); *G06Q 10/0836* (2013.01); *G06Q 10/0838* (2013.01); *G06Q 10/08345* (2013.01); *G06Q 10/08355* (2013.01); *G06Q 30/0601* (2013.01)

(58) Field of Classification Search
CPC ............. G06Q 10/087; G06Q 10/0833; G06Q 10/08345; G06Q 10/08355; G06Q 10/0836; G06Q 10/0838; G06Q 30/0601
See application file for complete search history.

(56) References Cited

U.S. PATENT DOCUMENTS

| | | |
|---|---|---|
| 6,876,958 B1 | 4/2005 | Chowdhury et al. |
| 8,326,679 B1 | 12/2012 | Rowe et al. |
| 8,340,812 B1 | 12/2012 | Tian et al. |
| 8,560,461 B1 | 10/2013 | Tian et al. |
| 8,924,007 B2 | 12/2014 | Arunapuram et al. |
| 9,230,233 B1* | 1/2016 | Sundaresan ........ G06Q 10/0832 |
| 10,740,714 B2* | 8/2020 | Saito .................. G06Q 30/0635 |
| 2003/0144971 A1* | 7/2003 | Das ........................ G06Q 20/20 705/401 |

(Continued)

OTHER PUBLICATIONS

Stecke, et al., Production and Transportation Integration fora Make-to-Order Manufacturing Company with a Commit-to-Delivery Business Mode, Manufacturing & Service Operations Management, vol. 9, Issue 2, Apr. 2007, pp. 123-224 (Year 2007).*

*Primary Examiner* — Daniel Vetter
*Assistant Examiner* — Christopher Gomez
(74) *Attorney, Agent, or Firm* — Merchant & Gould P.C.

(57) ABSTRACT

Methods and systems are described for optimizing delivery modes used to transport items to a customer. A delivery optimization system includes an online ordering system, a delivery mode optimizer, an order allocator, a cartonization engine, and a ship label and manifest generator. The delivery mode optimizer selects an optimal shipping mode based on information received from carriers. The lowest cost option to deliver the goods to the destination by a promised delivery date is selected at the time the order is received. A shipping node is selected that can supply the items needed to fulfill the order within the desired timeframe. Cartons are selected to package the items in the order in the most cost effective manner. The delivery mode is reevaluated after the order is prepared for shipment to determine if available shipping options have changed.

18 Claims, 16 Drawing Sheets

(56) References Cited

U.S. PATENT DOCUMENTS

| | | | |
|---|---|---|---|
| 2008/0133305 A1* | 6/2008 | Yates | G06Q 30/0241 |
| | | | 705/14.4 |
| 2016/0125352 A1* | 5/2016 | Tian | G06Q 10/04 |
| | | | 53/445 |
| 2018/0024554 A1* | 1/2018 | Brady | G06Q 10/0837 |
| | | | 701/23 |
| 2019/0354924 A1* | 11/2019 | Fukushima | G06Q 10/0631 |
| 2020/0175472 A1 | 6/2020 | Kaiser et al. | |

* cited by examiner

| ID | type | container | Max Volume | Actual Volume | Expected Volume | Max Weight | Empty Weight | Length | Width | Height |
|---|---|---|---|---|---|---|---|---|---|---|
| 3 | Box | 413 | 645 | 645 | 645 | 80 | 0.45 | 12.75 | 7.5 | 6.75 |
| 4 | Box | 285 | 10500 | 10500 | 11343 | 80 | 2.87 | 34.69 | 19.69 | 15.38 |
| 5 | Box | 280 | 4551 | 4551 | 4551 | 80 | 1.85 | 22.63 | 19.63 | 10.25 |
| 6 | Box | 278 | 7443 | 7443 | 7443 | 80 | 2.25 | 28.63 | 19.63 | 13.25 |
| 7 | Box | 277 | 3483 | 3494 | 3494 | 80 | 1.7 | 31.63 | 17.63 | 6.25 |
| 8 | Box | 126 | 309 | 309 | 309 | 35 | 0.3 | 9 | 6.25 | 5.25 |
| 9 | Bag | 310 | 193 | 193 | 193 | 40 | 0.11 | 10 | 13 |  |
| 10 | Bag | 320 | 619 | 619 | 619 | 40 | 0.11 | 14.5 | 19 | 8 |
| 11 | Bag | 330 | 1344 | 1344 | 1344 | 40 | 0.11 | 19 | 24 | 10 |
| 12 | Bag | 340 | 2437 | 2437 | 2437 | 40 | 0.13 | 24 | 28 | 10 |
| 1 | Box | 454 | 3193 | 3193 | 3573 | 65 | 1.4514 | 18.625 | 16.625 | 10.3125 |
| 13 | Bag | 370 | 90 | 90 | 90 | 40 | 0.046 | 11 | 8.5 | 1 |
| 2 | Box | 438 | 1815 | 1815 | 1815 | 65 | 0.9 | 11 | 11 | 15 |

Incoming Order #497682058

Order Date: 7/25/19
Customer Zip Code: 51466
Delivery Promise Date: 7/30/19

Items:
    7Qt Slow Cooker    1
    Kitchen Towels    2
    Porcelain Mug    1

1604

Initial Shipping Mode and Node Allocation:

Node A: USPS Retail Ground
    7Qt Slow Cooker    1
    Kitchen Towels    2
    Porcelain Mug    1
Container(s): Box A197

1606

Order #497682058 Prepared
Prep Date: 7/27/19
Order Date: 7/25/19
Customer Zip Code: 51466
Delivery Promise Date: 7/30/18

Items:
    7Qt Slow Cooker    1
    Kitchen Towels    2
    Porcelain Mug    1

1608

Optimal Shipping Mode:

Node A: USPS Priority Mail Express
    7Qt Slow Cooker    1
Container(s): SIOC
Node A: UPS Ground
    Kitchen Towels    2
    Porcelain Mug    1
Container(s): Box B936; Bag 21A

FIG. 16

LOCATION-SPECIFIC OPTIMIZED IN-STORE CARTONIZATION

TECHNICAL FIELD

The present disclosure is directed to methods and systems for optimizing delivery modes and other delivery parameters. More particularly, the present disclosure describes a system architecture for selecting an optimal delivery mode for transporting items within a supply chain, including optimizing a cartonization determination for transporting items to customer locations from an in-store delivery service.

BACKGROUND

There are a multitude of options for shipping goods from an origin to a destination. Efficient supply chain management requires leveraging the fastest, cheapest methods of shipping goods to a destination. Many factors such as cost, speed, delivery schedules, and service options must be taken into account to determine the best shipping option. In instances where a delivery must take place within a given timeframe, cost considerations may give way to speed considerations.

Existing methods of selecting shipping modes analyze shipping factors and make a determination of which carrier and service option will be used for a delivery at the time an order is placed for goods. However, delivery schedules can change due to delays or orders can be prepared faster than expected. The optimal delivery mode may change between the time an order is placed and when the order is ready to be shipped. A method of determining an optimal delivery mode for shipping items to account for changes that take place during order preparation is needed.

Still further, existing shipping methods do not account for variabilities in product dimensions, and the specific types of shipping containers that might be available at locations within a supply chain that do not have as a primary task shipping to customers (e.g., in-store, retail locations). Because existing systems do not account for such variability in types of shipping containers that may be available or other shipment parameters (e.g., costs of shipping different types of containers from different locations), often sub-optimal shipping decisions in terms of carrier selection and carton selection for use with a particular product and carrier are made.

SUMMARY

In general terms, the present disclosure relates to methods and systems for optimizing delivery modes for transporting items between nodes of a supply chain. In some aspects, the delivery modes are optimized to ultimately deliver items ordered by a customer online to the customer's location. The optimal delivery mode is defined by at least one node, at least one carrier, and at least one carton that will be utilized to fulfill the customer's online order within the given timeframe promised for order delivery. The delivery modes are updated at the time the order is prepared for shipment. The optimal delivery mode could change due to differences between the expected and actual order preparation time, delivery schedules, availability of bulk shipping discounts, and other changes in carrier rates. Optimal delivery modes provide for transportation of items to a customer within a promised timeframe at the lowest available price point.

According to the present disclosure, a computer-implemented system allocates items to containers. The system includes an application programming interface configured to mediate retrieval of item attribute data and container attribute data from one or more data sources. The system also includes a cartonization engine that is configured to retrieve item attribute data for one or more of a plurality of different items from one or more item attribute information sources. The item attribute data includes volumes of the different items. Container attribute data is retrieved for one or more of a plurality of different containers from one or more container attribute information sources. The container attribute data includes interior dimension of the different containers. The cartonization engine calculates a volume of space required to container the different items based on the volumes of the different items and a set of business rules defining compatibility of items and containers. The cartonization engine also calculates a volume of space available in the containers and then determines which of the different items to place into the different containers. Finally, the determination is displayed on a user interface.

In another aspect, a computer implemented method of maximizing the amount of items that are stored in a container is described. Container attributes for the container are obtained from a container attribute information source. The container attributes include at least interior dimensions of the container. An available volume of the container is determined. Item attributes for a plurality of items available to be stored in the container are retrieved from an item attribute information source. The item attributes include at least dimensions of the items. An optimal selection of the plurality of items is determined to fill the available volume of the container and this optimal selection is output to a graphical user interface (GUI).

In yet another aspect, computer-implemented method of minimizing the amount and expense of packaging for one or more items in a retail order is described. Item attributes for the items are obtained from an item attribute information source. The item attributes include weight, dimensions, and packaging requirements of the items. A minimum volume required to container the items and total weight of the items is calculated. Container attributes for a plurality of containers available to container the one or more items in the retail order are retrieved. The container attributes include interior dimensions of the container and weight capacity of the container. One or more containers are determined that will contain the minimum volume and total weight of the items and meet the packaging requirements of the items. The containers are then output to a graphical user interface.

In another aspect, one or more non-transitory computer-readable media having computer-executable instructions embodied thereon that, when executed by one or more computing devices, cause the computing devices to perform a method of arranging a set of items into one or more containers, the method comprising: receiving shipment details comprising item identifiers; fetching item attribute information for the items represented by the item identifiers, the item attribute information comprising weights, dimensions, and packaging requirements of the items; fetching container attribute information for available containers, the container attribute information comprising weight capacity, volume capacity, and container type of the available containers; generate stack sequence identifying one or more of the available containers to package the items, the stack sequence being generated to minimize empty space within each container and minimize cost of shipping; map stack sequence to shipment details; and communicate stack sequence through an application programming interface to one or more consumers.

In yet another aspect, a method of optimizing packaging and delivery of items between a node of a retail supply chain and a customer is provided. Carrier information is received and stored. An online order is received from a customer for one or more items to be delivered within a given timeframe. Carrier options and container options are evaluated by node. An initial optimal delivery mode is assigned to order, where the initial optimal delivery mode is defined by at least one node, at least one carrier, and at least one carton used to fulfill the online order within the given timeframe. The order is allocated to one or more nodes consistent with the initial optimal delivery mode and cartonization instructions are communicated to the nodes. Confirmation of order preparation is received from the one or more nodes. Carrier options and containers options are reevaluated and a final optimal delivery mode is assigned to the order. One or more ship labels and manifests are generated as well as cartonization instructions. The ship labels and cartonization instructions are sent to the node and the manifests are sent to the carriers consistent with the final optimal delivery mode.

BRIEF DESCRIPTION OF THE DRAWINGS

FIG. 11 illustrates a table of container attributes.

FIG. 16 illustrates example views of a graphical user interface.

DETAILED DESCRIPTION

Figure 1:
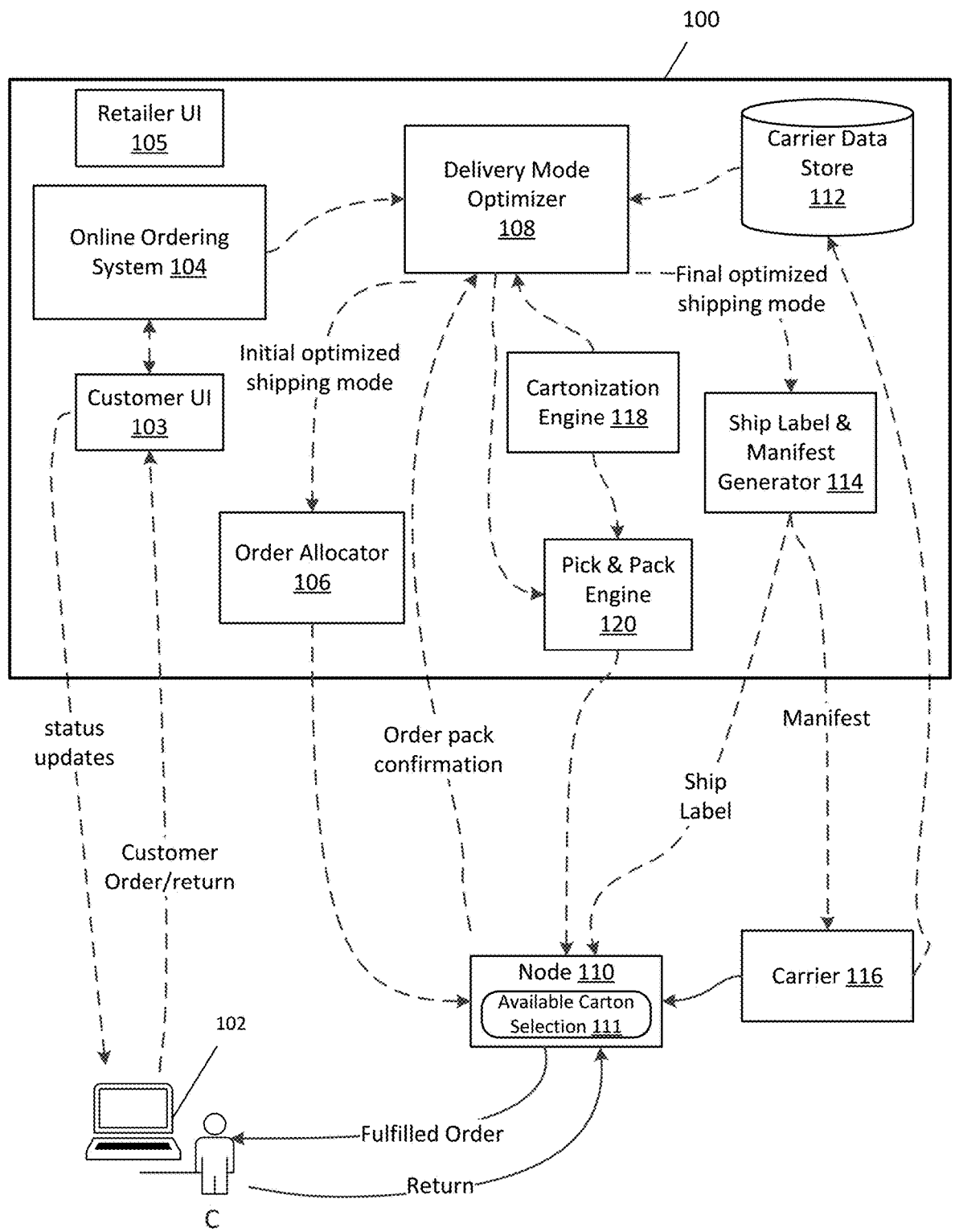
FIG. 1 illustrates a schematic diagram of an example delivery optimization system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The term "node" according to embodiments of this disclosure refers to a location within a supply chain. In some instances, the node could be a location from which shipments originate. In other instances, a node is a destination. The "node" can refer to a customer delivery address or other destination that is not considered to be within the retail enterprise. Nodes within a retail enterprise can include warehouses, retail stores, and other locations where items are stored. In some embodiments, shipments of packages including one or more items being purchased are transported from store or flow center nodes to customers. In some embodiments, packages including one or more items to be returned to a retailer are transported from customer nodes to store or flow center nodes.

The term "carrier" refers to a business providing shipping services from an origin to a destination. The carrier can operate various vehicles such as trucks, vans, airplanes, and ships. In the embodiments described, the carrier transports packages from a node to a customer. Carriers may offer various levels and speeds of service for transporting packages. For example, carriers can provide overnight service via air (airplane) or ground service which could take multiple days. Typically, faster services are more costly. In some cases, carriers offer bulk or volume discounts if enough packages are shipped from one node.

The term "carrier" encompasses businesses that provide shipping services on a contract basis, crowd-sourced delivery services, and shipping services provided in-house. The contract basis services could be operated by a delivery company that operates nationally, regionally, or locally. The contract basis services could be provided by employees, freelance workers, or independent operators. Crowd-sourced delivery services can be managed by a company that also manages a fleet of delivery workers that perform deliveries on an individual contract basis. The in-house shipping services could be a service within a retail enterprise that employs delivery workers to complete local deliveries or could be a program within a retail enterprise that incentivizes employees of the retail enterprise to perform some deliveries while traveling to or from their place of work at the retail enterprise.

FIG. 1 illustrates a schematic diagram 100 of an example delivery optimization system. A customer computing device 102 receives input from a customer C. In some embodiments, the input is received through a customer user interface (UI) 103 configured to display options for ordering items for delivery. In some embodiments, the customer input places an order for one or more items to be delivered to the customer from a retailer. The customer order is received by the online ordering system 104 where it is processed for fulfillment. In some embodiments, the customer input places a request for one or more items to be returned to the retailer from the customer. The customer may desire an exchange or refund and needs the items to be transported back to the retailer. The return request is received by the online ordering system 104 where it is processed for a refund or exchange.

The online ordering system 104 operates to receive and process orders received from customers. In some embodiments, the online ordering system 104 can receive orders from multiple sources such as orders placed online from a retail store as well as orders placed by customers online through a website. The online ordering system 104 forwards order information to the delivery mode optimizer 108. The order information can include identification of items, quantity of items, requested delivery speed, and delivery address.

In some embodiments, the online ordering system 104 also operates to process return requests from customers. In some instances, the customer may wish to return an item for a refund. There are various options for how the item can be transported from the customer C back to the retailer.

The delivery mode optimizer 108 operates to evaluate carrier options to select an optimal shipping mode. The delivery mode optimizer 108 receives customer orders for one or more items from the online ordering system 104. The delivery mode optimizer 108 processes the orders to determine a delivery location for the order and the items requested in the order. In some embodiments, the zip code of the delivery location is determined.

The delivery mode optimizer 108 accesses carrier information from the carrier data store 112. The carrier information is utilized to evaluate carrier options for delivering the ordered items to the delivery location. The carrier information is analyzed to determine the lowest cost carrier and type of delivery service that can be utilized to deliver an order to a customer by a promised delivery date.

In some embodiments, the delivery mode optimizer 108 can also access information provided by a cartonization engine 118. This information includes dimensions and weights of various packages. This information can be utilized to calculate costs of shipping based on weight and/or volume.

In some embodiments, the delivery mode optimizer 108 determines optimal shipping modes for transporting returned items from customers back to a node within the retail enterprise supply chain. This applies to any items that the customer does not return to a store themselves and to any items that the retailer determines are worth the cost of transporting back to a retail store or flow center. The delivery mode optimizer 108 evaluates carrier options for transporting the items to be returned from a customer's location back to a particular node within the retail supply chain.

The delivery mode optimizer then assigns an initial optimal shipping mode to the order or return. This initial optimal shipping mode is communicated to the order allocator 106. The carrier data store 112 and delivery mode optimizer 108 are described in further detail in FIG. 3.

The order allocator 106 operates to allocate orders to nodes within a supply chain to fulfill the orders. Nodes can include receiving centers, flow centers, warehouses, stock rooms attached to retail stores, and in-store inventory of retail stores. In some instances, an order can be fulfilled at a single node. In other instances, the order may need to be filled using items from multiple nodes. One example of an order allocator is described in U.S. patent application Ser. No. 16/160,648 filed Oct. 15, 2018, which is herein incorporated by reference in its entirety.

The order allocator 106 selects stores, warehouses, etc. based on shipping schedules of carriers. Generally, a regularly scheduled pick-up time exists for each of a plurality of carriers for a given node. If two different nodes have the same items in stock that are needed to fulfill an order but a first node has a shipping schedule that will go out sooner than a second node, the first node will be selected over the second one because the items will be shipped out sooner and, if the node is as close or closer to the customer than the second node, the items of the order will arrive at the customer's address more quickly.

The order allocator 106 also selects nodes to fulfill orders based on available inventory. For example, if an order includes items A, B, and C, the order allocator 106 could assign the order to one node to fulfill the entire order if that node has the requested number of each of items A, B, and C in stock. If a single node does not have all requested items in stock, an order could be assigned to two or more nodes for fulfillment.

Further, even if a single node has all items in stock to fulfill an order, that node may be too far away from a customer for shipping from the node to the customer to be timely. Two separate nodes located closer to the zip code of the delivery address may be selected to fulfill an order. For example, node 1 could be assigned to supply items A and B and node 2 could be assigned to supply item C.

The order allocator 106 can also consider success rates of the nodes when assigning orders to nodes. The success rates indicate how often orders are correctly fulfilled at a node in the requested timeframe. Success rates can take into account accuracy of order fulfillment. Accuracy includes providing the correct items in the correct amounts for a given order. Package quality can also be taken into account. Package quality is considered good if the items of the order arrive to the customer in good condition. If the items are damaged, the package quality is considered bad.

Another factor is timeliness. If the ordered items are packaged and ready for shipment in the estimated timeframe or less, the timeliness is considered good. If a node consistently prepares orders in an amount of time that is longer than expected, the timeliness is bad. All of these quality factors can be taken into account when allocating orders to a given node.

The order allocator also considers other data such as capacity, throughput, and building in-by calendars to select and allocate orders to nodes that comply with delivery promise dates.

Once the order allocator 106 has allocated orders to nodes, the assignments are communicated to the nodes. In the example of FIG. 1, only one node 110 is depicted. However, two, three, four, or more nodes may be utilized to handle a single order. The node or nodes receive information about the items that are to be packed for a given order. If a node is assigned to provide a subset of items in a given order, the assignment will indicate such and specify which items the node is required to provide for that order. The assignments include a description and quantity of each item that is to be included for a given order.

At the node 110, the order is picked and packed. The items in the order are selected from inventory storage and packaged for shipment. In instances where more than one item is packed for a single order, the different items may be packaged into the same container. In some instances, only part of the ordered items are packed at one node and other items are packed at a different node. It is noted that each node 110 may have its own selection of cartons (e.g., available carton selection 111) available for pick/pack of a given order. Accordingly, a cartonization decision made by the cartonization engine 118 should, as discussed below, define a carton selection that is consistent with the selection available at a given node, as well as being consistent with selected carrier options. Because, as discussed herein, carrier options may be finally set only shortly before shipment labels are generated, a final carton selection may also only be defined at the time a shipment label is finalized and generated.

The pick and pack engine 120 manages information regarding orders that need to be prepared for shipment. The pick and pack engine 120 can access information from the delivery mode optimizer 108 to determine how orders should be prioritized for pick and pack. For example, if an order could be prepared for shipment in time to receive a bulk discount, that order could be expedited for the pick and pack process. A message will be sent to a user computing device at the node 110 to notify employees that the order should be prioritized.

The pick and pack engine 120 can also access information from the cartonization engine 118 to inform employees of recommended packaging for items in an order. The cartonization engine 118 also provides information to the delivery mode optimizer 108 regarding the dimensions and weights of packages for the purposes of calculating shipping costs.

Once the order is ready for shipment, the node 110 communicates a confirmation back to the delivery mode optimizer 108. An employee that packaged the items for shipment could submit the confirmation using a computing device at the node. In some examples, a barcode corresponding to the order could be affixed to the one or more packages containing items for the order and the employee could scan the barcode and the computing device would submit the corresponding information associated with the barcode to the delivery mode optimizer 108.

In some embodiments, the cartonization engine 118 is utilized to determine the proper packaging to ship items. The cartonization engine 118 operates to improve the manner in which cartonization occurs for different types of products. For example, for each item, item characteristics are tracked including dimensions. Item attributes are used to determine if a box, bag, mailer, specialty box, or gift is selected. Based on these item characteristics, a package of appropriate size and type is selected.

The cartonization engine 118 can operate to generate a user interface to employees to aid in selecting package size and type for packing orders. The user interface can also illustrate how to place items into a particular package to maximize space within the package.

In some examples, the confirmation is also communicated to the online ordering system 104. The order status could be updated at the online ordering system 104. In some examples, the order status can be viewed using a GUI for a customer (103) or a retailer employee (105). An example GUI is described in FIGS. 6 and 7.

The delivery mode optimizer 108 once again determines an optimal shipping mode for the order once the confirmation is received. Because shipping schedules could change or the timing of the order preparation could be different from that predicted at the time the order was received, the delivery mode optimizer 108 reevaluates the optimal shipping mode for delivering the completed order to the customer. The delivery mode optimizer 108 accesses updates to carrier information and determines the optimal delivery mode for sending the ordered items to the customer.

The final optimal delivery mode may differ from the initial optimal delivery mode because of different reasons. One is that actual fulfillment of the order took longer to process than expected. The volume of packaged orders may be different than anticipated. Some carriers have volume requirements and must hit a threshold level to achieve a lower shipment rate. If the volume of packages does not reach the threshold, the costs may be higher than expected to deliver the orders. In such instances, it may be cheaper to use a different carrier than initially planned.

In other instances, the order could be prepared more quickly and a slower shipping method could be used to complete the order at a lower cost to the retailer. In other examples, there may be a delay in preparing the order for shipment. Such delays could cause an order to miss the cut off time for a particular carrier to pick up a shipment. An expedited shipping mode may be required to complete the order delivery to the customer by the promised time. In yet other examples, a first shipping method may be selected initially, but delays with the carrier may change the shipping schedule on the day that the package is to be picked up at the node. In such instances, a different carrier may be selected because that carrier will be making a pick up at the node next.

The final optimized shipping mode is communicated to the ship label and manifest generator 114. The final optimized shipping mode includes a carrier and a shipping speed. The ship label and manifest generator 114 receives the carrier and shipping speed information from the delivery mode optimizer 108. The ship label and manifest generator 114 also receives information about the items in the order from the online ordering system 104. The information about the packages is used to populate the manifest.

The ship label is sent to the node 110 or nodes from the ship label and manifest generator 114. The ship label can be physically sent to the node 110. In other aspects, the ship label is electronically sent to the node 110. The ship label is then affixed to the package or packages containing items for the order. In the case of electronic ship labels, a printer at the node may be utilized to generate a physical label for the packages. A copy of the ship label may be sent to the carrier assigned to the order as well.

Once the ship label is printed at the node, it is applied to a package or carton containing items for the order. The shipping label will be used by the carrier to confirm the delivery address. In some embodiments, the shipping label also operates to provide information about particular items within a package such as lithium or hazmat materials. The ship label can be scanned at one or more points of the delivery process to send updates back to the online ordering system 104. These updates can be viewed through either the customer UI 103 or the retailer UI 105.

The manifest is sent to the carrier or carriers assigned to deliver the order from the node or nodes to the customer. The carrier can use the manifest to confirm that an order is complete and ready for shipment. The manifest documents all of the packages that will be included in the same truckload for shipment.

Once the package or packages containing items from the customer's order are picked up by the carrier, they are transported to the customer. The transportation of the packages could take a route that stops multiple times before arriving at the customer's address. In some instances, the packages could be transferred from one vehicle to another. The packages could pass through processing centers before being shipped to the final customer address. In some instances, if the packages need to arrive quickly, the carrier might take them directly from the node to the customer address.

The carrier may scan the ship label upon delivery of the order to the customer. The scan gathers information about the order and sends a confirmation to the online ordering system 114. This information is used to determine if the order was delivered within the promised timeframe. This information can be utilized for planning future order deliveries and determining future optimal shipping modes.

Figure 2:
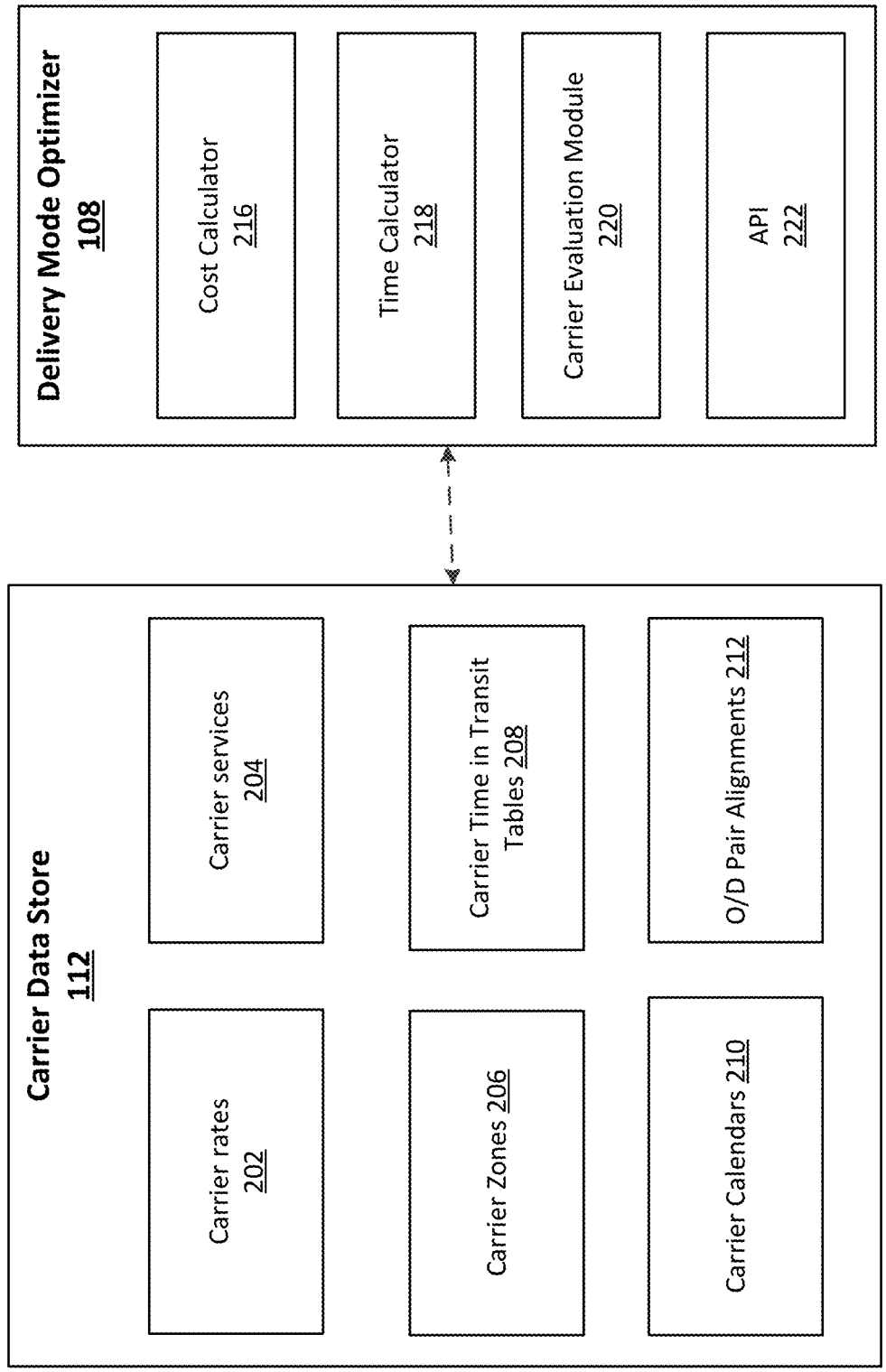
FIG. 2 illustrates a more detailed schematic diagram of the carrier data store and delivery mode optimizer of FIG. 1.

FIG. 2 illustrates a more detailed schematic diagram of the carrier data store 112 and delivery mode optimizer 108. The carrier data store 112 includes carrier rates 202, carrier services 204, carrier zones 206, carrier time in transit tables 208, carrier calendars 210, and origin/destination (O/D) pair alignments 212. The carrier data store 112 can be populated with information provided directly by the carriers. In some embodiments, carrier information is gathered by the retailer and populated into the database. This can be input manually or gathered automatically using software to automate the process. In some embodiments, carrier data is gathered by a third party provider.

Carrier rates 202 provide prices for transporting packages from an origin to the destination. The prices can vary based on distance and speed of shipping. The speed of shipping is defined by the service type. The distance is determined based on zip codes and carrier zones. Carrier rates can be defined by individual packages based on weight. In some instances, carrier rates can be provided for bulk shipments based on number of packages or overall weight of a shipment.

Carrier services 204 refer to different types and speeds of shipping. Domestic carriers offer different types of service by truck or air. The speed of service depends on the distance and type of vehicle used. For example, a shipment could be made as soon as the same day for a higher price. The shipment could travel by plane and truck to arrive at its destination within a defined geographic area. The speed of service could provide for delivery within minutes, hours, or days of an order being placed. In some embodiments, a customer can select from possible delivery speeds. Some local shipments can be made within an hour, two hours, four hours, eight hours, twelve hours, or 24 hours. Local shipments may be completed by contract services or crowd-sourced delivery. Often for a shipment to travel to another state within the same day or even the next day, air travel is required to transport packages. Such deliveries could be made within 12 hours, 24 hours, 48 hours, or longer. Other services are less costly, but take longer. For instance, some ground transport options deliver packages via truck or van and can take up to 10 business days. Other ground transport options could provide for delivery within 7 business days, within 5 business days, within 3 business days, or within 2 business days. Various other options are available that can be weighed for speed versus cost.

Carrier zones 206 are used to determine the cost of shipping from one geographic area to another. Carrier zones can be defined by the origin location or the destination location. The location can be defined by its zip code. The distance between origin and destination defines the zones.

Carrier time in transit tables 208 define the time it is expected to take to deliver a shipment from an origin to a destination. In some instances, this is based on the time of travel from one zip code to another. The time in transit tables differ based on the carrier service used.

Carrier calendars 210 define the days of operation of a given carrier. This can include holidays in which the carrier is not operating. The calendar can differ based on the level of service. For example, critical express services might operate on holidays but discount ground services might not. The carrier calendars 210 define the days of operation throughout the year for each carrier and service type.

The carrier calendars 210 also provide pick-up times and cut-off schedules. Pick-up times are defined times that a particular carrier is scheduled to pick-up packages at a particular node. Cut-off schedules are defined times that determine the latest a package can be assigned to a particular carrier to be included in the next pick-up.

Origin/Destination pair alignments 212 refer to predetermined routes that extend between an origin location and a destination location.

The delivery mode optimizer 108 includes a cost calculator 216, a time calculator 218, a carrier evaluation module 220, and an API 222.

The cost calculator 216 utilizes the carrier rates 202, carrier services 204, and carrier zones 206 to calculate an overall shipping cost for an order. In some embodiments, the cost calculator 216 also utilizes information regarding package weight, dimensions, and contents to determine the cost of shipping. The weight and dimensions of a package can be provided by the cartonization engine 118. The cost can be calculated for a plurality of possible nodes that could supply the items in the order. In some instances, the cost is only calculated for nodes that are within a predefined distance threshold of the destination zip code. The cost calculator 216 could calculate all possible shipping costs between nodes and the customer address.

The time calculator 218 utilizes the carrier services 204, carrier time in transit tables 208, and carrier calendars 210 to calculate an overall amount of time that a shipment is expected to take to get from a node to a customer. The time calculator 218 calculates times for multiple nodes that could supply items to a customer in fulfillment of an order. In some instances, the time is only calculated for nodes that are within a predefined distance threshold of the destination zip code.

The carrier evaluation module 220 evaluates the possible carrier options that could transport items from nodes to the customer address. The carrier evaluation module 220 takes into account the values calculated by the cost calculator 216 and time calculator 218 to determine which carriers, service types, and nodes provide the best combination of low cost and timeliness to complete the order within the designated time frame. The carrier evaluation module 220 determines the optimal shipping mode for one or more nodes.

The API 222 operates to communicate information between the delivery mode optimizer 108 and other programs. For example, the API 222 can communicate information between the delivery mode optimizer 108 and the online ordering system 104. The API 222 can also connect to a user interface, such as the retailer user interface 105.

Figure 3:
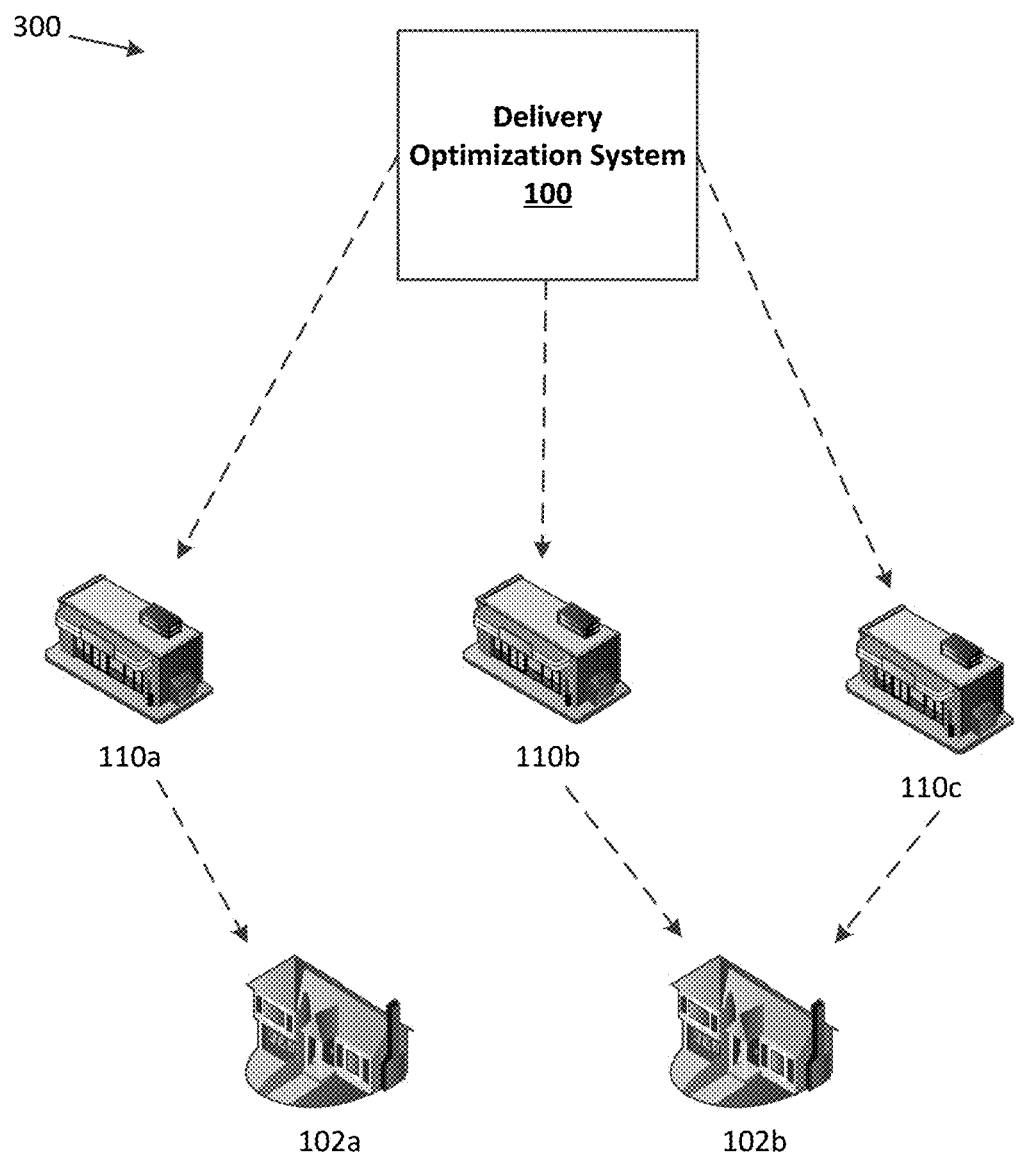
FIG. 3 illustrates a schematic diagram of an example supply chain for a retail enterprise

FIG. 3 illustrates a schematic diagram 300 of an example supply chain for a retail enterprise. This is just one simplified example of a supply chain in which the present systems and methods can operate. The diagram 300 illustrates the flow of inventory from delivery optimization system 100 to customer 102. The delivery optimization system 100 assigns orders to one or more nodes 110 for fulfillment and delivery to customers 102. In practice, the supply chain could include many more nodes which could include different levels of the supply chain. Such levels can include receive centers, flow centers, and retail stores. A more detailed description of an example supply chain is provided in U.S. patent application Ser. No. 15/898,837 filed Feb. 19, 2018, which is herein incorporated by reference in its entirety.

Orders are received at the delivery optimization system 100 and then assigned to nodes and carriers as described above in FIG. 1. The delivery optimization system 100 in the simplified example of FIG. 2 can assign orders to one or more of the nodes 110. For example, a first order could include three different items. The delivery optimization system 100 could assign all three items to node 110a for fulfillment. The delivery optimization system 100 may determine that it is most cost efficient to assign two items to node 110b and 1 item to node 110c. Or the delivery optimization system 100 could even assign a first item to node 110a, a second item to node 110b, and a third item to 110c. Items assigned to the nodes 110 are picked and packaged for delivery to customers 102.

In the example of FIG. 3, an order placed by the customer 102a could be for items that are best fulfilled by the single node 110a. The order placed by customer 102b could be more efficiently fulfilled by delivering items from both 110b and 110c to the customer 102b.

It is in this general supply chain retail environment that the following systems and methods operate. While FIG. 3 describes a retail environment having generic nodes, this environment could be for a retailer having brick-and-mortar stores as well as online sales, a retailer only handling online sales, or other distribution systems that require transportation of goods. The customers could be individual people, businesses, or even other locations within the retail business.

Figure 4:
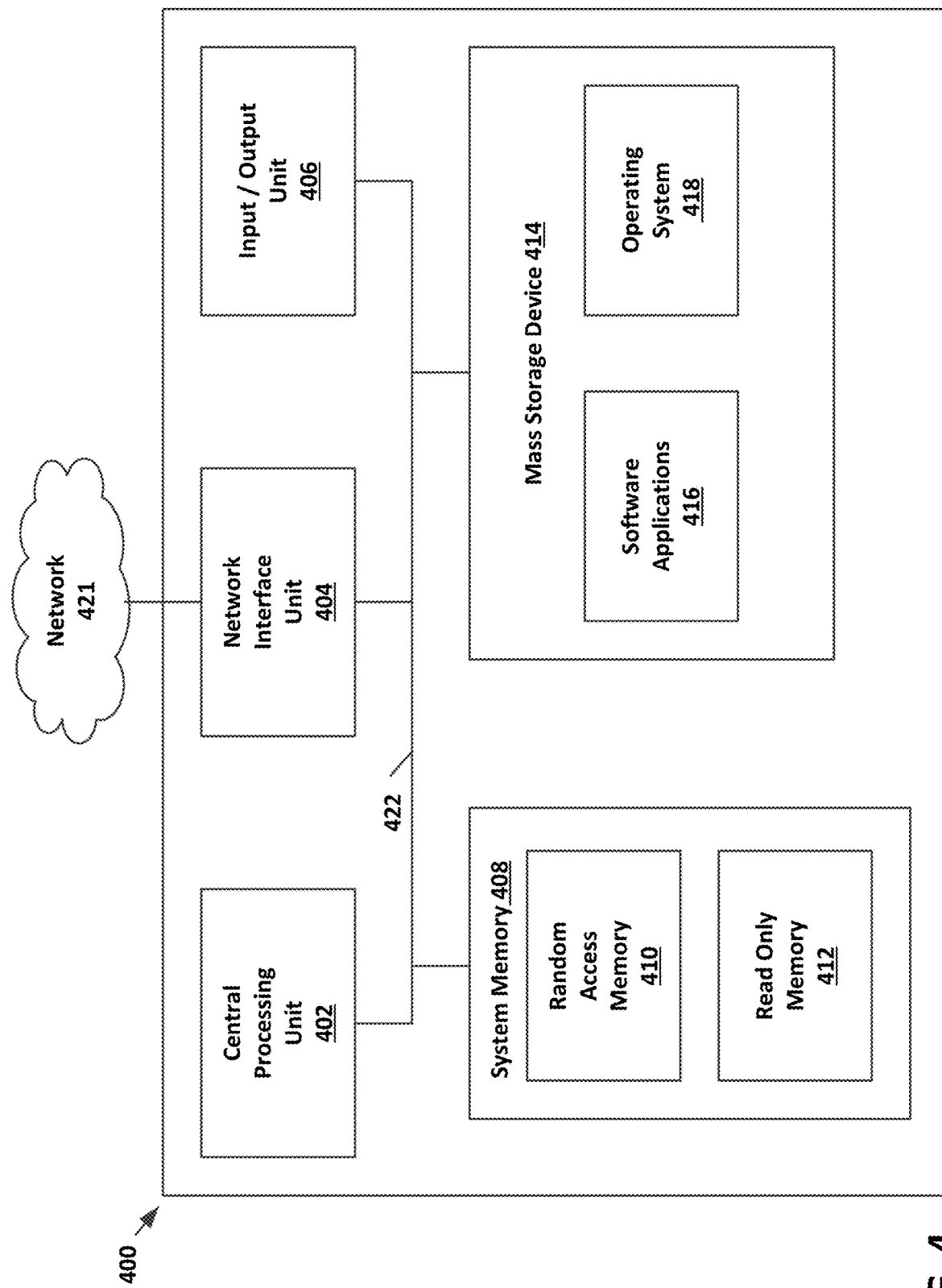
FIG. 4 illustrates an example block diagram of a computing device useable to implement aspects of the delivery optimization system of FIG. 1.

Referring now to FIG. 4, an example block diagram of a computing device 400 is shown that is useable to implement aspects of the delivery optimization system 100 of FIG. 1. For example, the computing device 400 can be used to place orders as the customer computing device 102.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 420 to receive and analyze carrier information to optimize delivery modes.

Figure 5:
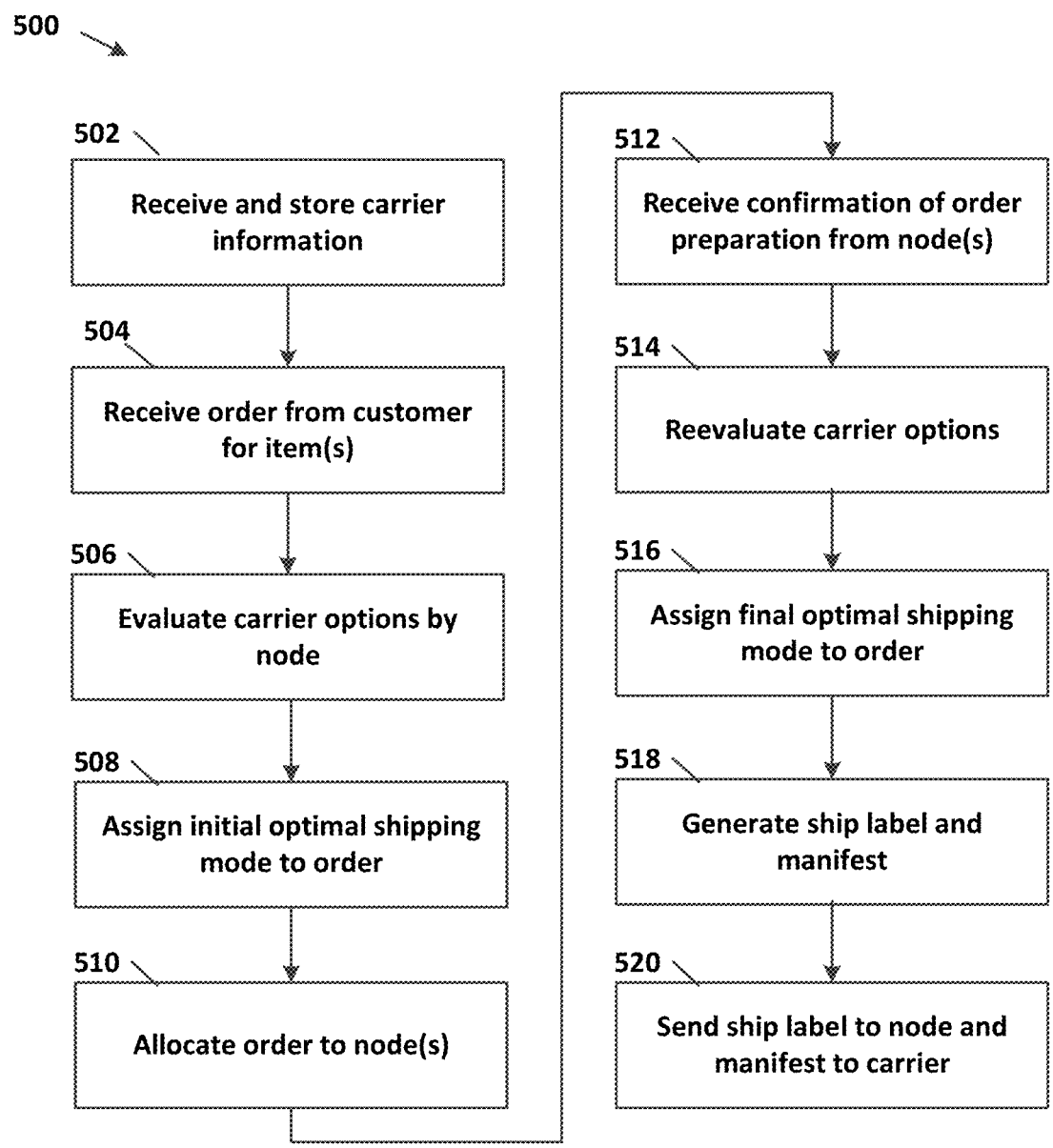
FIG. 5 illustrates a flow diagram of an example method of optimizing delivery of orders to customers.

Referring now to FIG. 5, a method of optimizing delivery of orders is described.

At operation 502, carrier information is received and stored. In some embodiments, carrier information is received directly from one or more carriers. In other embodiments, a third party service gathers information about the carriers. The carrier information is stored in a carrier data store 112. The carrier information can include some or all of the following: carrier rates 202, carrier services 204, carrier zones 206, carrier time in transit tables 208, carrier calendars 210, and O/D pair alignments 212.

At operation 504, an order is received from a customer for one or more items. The customer order can be placed on a customer computing device 102 through a customer user interface 103. The order can be for a single item, multiple different items, or multiple of the same item. In some embodiments, the customer can select a desired shipping speed. The desired shipping speed could provide for delivery within minutes, hours, or days. In some embodiments, the customer will pay more for expedited shipping. In some aspects, the customer will be offered free shipping depending on the speed selected.

The item descriptions, quantities, delivery address, and desired shipping speed are extracted from the orders at the online ordering system 104. This information is forwarded to the delivery mode optimizer 108.

At operation 506, carrier options are evaluated by node. The delivery mode optimizer 108 receives the order information and accesses the carrier data store 112 to analyze carrier information. The cost calculator 216 evaluates the cost of shipping from one or more nodes to the customer address. The time calculator 218 evaluates the time required for shipping from one or more nodes to the customer address. Both calculators take into account different carriers, shipping types, and shipping speeds. The carrier evaluation module 220 analyzes the costs and times calculated by the cost calculator 216 and time calculator 218 to determine initial optimal delivery modes available for one or more nodes.

At operation 508, an initial optimal shipping mode is assigned to the order. The initial optimal shipping mode may differ depending on the node. In some aspects, more than one node will be utilized to fulfill the order. Multiple initial optimal shipping mode options may be generated for multiple nodes at this point.

At operation 510, the order is allocated to one or more nodes in the supply chain. The order allocator 106 receives the initial optimal shipping mode options from the delivery mode optimizer 108. Based on this initial optimal shipping mode and other factors, the order allocator 106 determines which node or nodes will fulfill the order. Other factors considered include item availability at the nodes, node success rates, and shipping schedules at the nodes. Once the order is allocated to one or more nodes, the order information is sent to the selected node(s).

At the node, the order is picked and packed. Picking involves selecting the items requested in the order from storage or a sales floor within a retail store. Numbering systems can be utilized to locate items in large warehouses. Packing involves placing the items in packaging for shipment. In some embodiments, a cartonization engine 118 supplies recommendations of type and size of packages to use for packing. The cartonization engine 118 can also recommend methods of packing items in the selected packages.

The delivery mode optimizer 108 can be accessed to determine whether picking and packing a particular order could be expedited to enable a less costly shipping method to be utilized. For example, a first order could be packaged for transport by a local carrier to a destination. A second order is to be transported to a destination along the local carrier's route. If the second order is expedited for packaging, it could be included with the local carrier's pickup to reduce costs.

At operation 512, confirmation of order preparation is received from the one or more nodes. The confirmation is received at the delivery mode optimizer 108. The confirmation includes a request to reevaluate delivery modes.

At operation 514, the carrier options are reevaluated. Using the same methods as before, the delivery mode optimizer 108 analyzes the carrier information. The analysis is updated based on any changes that have occurred between the time the order was first received and processed and the time that the order was prepared for shipment. In some instances, the order will be prepared in more or less time than expected and the available shipping options will be different.

As discussed above, the order preparation could have taken less time, allowing for a slower, less expensive shipping method to be used. Alternatively, the order preparation could have taken more time than expected, requiring a faster, more expensive shipping method to be used to deliver the order by the requested time.

At operation 516, a final optimal shipping mode is assigned to the order. The delivery mode optimizer 108 determines if the initial optimal shipping mode should be changed. If so, a different final optimal shipping mode is assigned and communicated to the node where the order was prepared for shipment.

At operation 518, a ship label and manifest for the order is generated. The ship label and manifest generator 114 generates the ship label and manifest. The ship label reflects the final optimal shipping mode.

At operation 520, the ship label and manifest are sent. The ship label is sent to the node for application to the package containing the ordered items. In some instances, there will be multiple ship labels for multiple packages in order to complete an order. The ship label and manifest generator 114 sends the manifest to the carrier or carriers that will transport items from the one or more nodes to the customer. The manifest can include information for multiple orders that will be picked up from the same node.

The carrier(s) will then pick up the packages containing the ordered items and transport them to the specified address. If all goes as planned, the customer will receive the items within the timeframe requested when placing the order. In some embodiments, packages are routed through a sort facility before being transported to a final destination.

Figure 6:
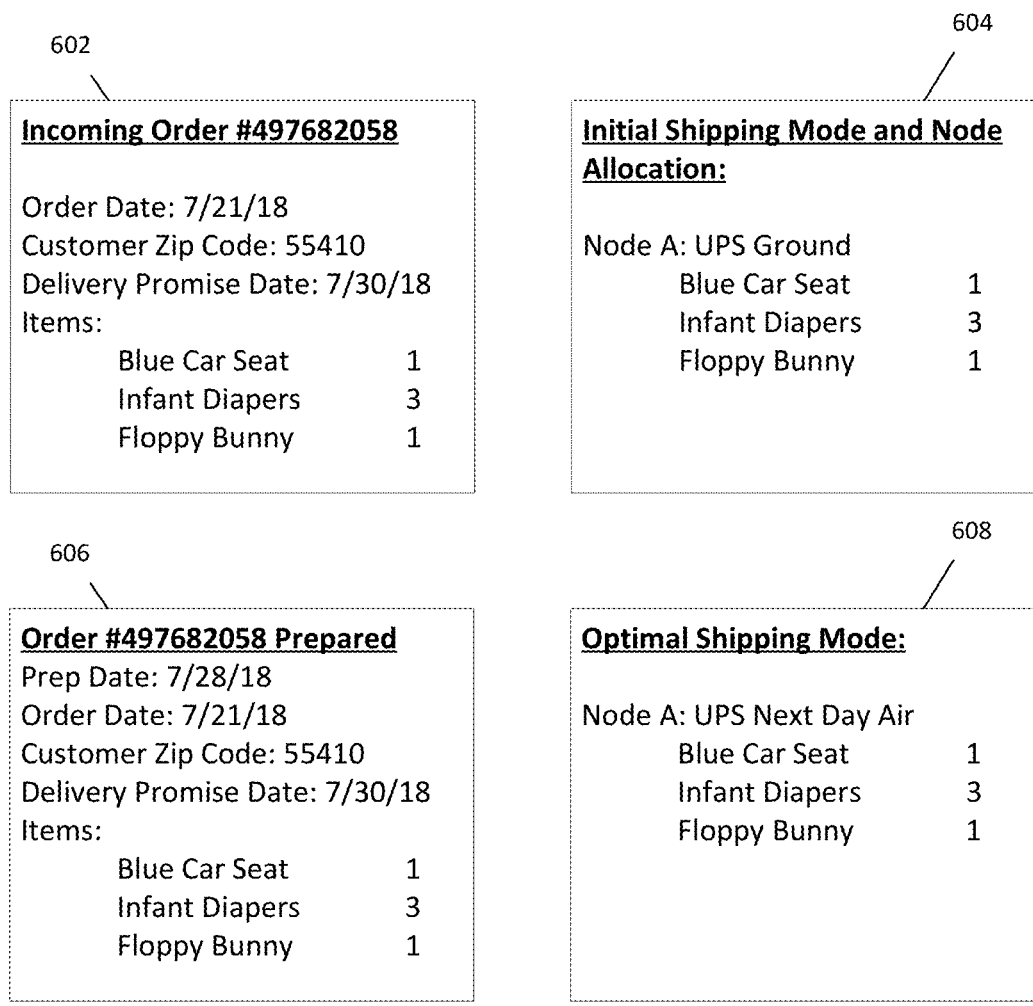
FIG. 6 illustrates example views of a graphical user interface.

Referring now to FIG. 6, example views of a GUI are displayed. The GUI displays information that could be viewed on a computing device to view shipping status. In this example, a delay in preparing the order causes the optimal shipping mode to change in order to comply with the promised delivery date to the customer.

View 602 shows order information for an incoming customer order. The information displayed includes an order date (Jul. 21, 2018) and the zip code of the delivery destination (55410). The delivery promise date (Jul. 30, 2018) is provided along with a list of the items in the order.

View 604 shows the initial optimal delivery mode selected for the order. The order has been allocated to Node A. UPS has been selected as the carrier with Ground as the service type.

View 606 shows the order preparation confirmation. The order prep date indicates that the order was prepared by Jul. 28, 2018.

View 608 shows the final optimal shipping mode selected for the order. In this example, there was a delay in preparing the order compared to what was expected. The carrier has not changed, but the service type has changed to a faster service—Next Day Air. This is done to ensure that the order is sent to the customer by the promised date of Jul. 30, 2018.

Figure 7:
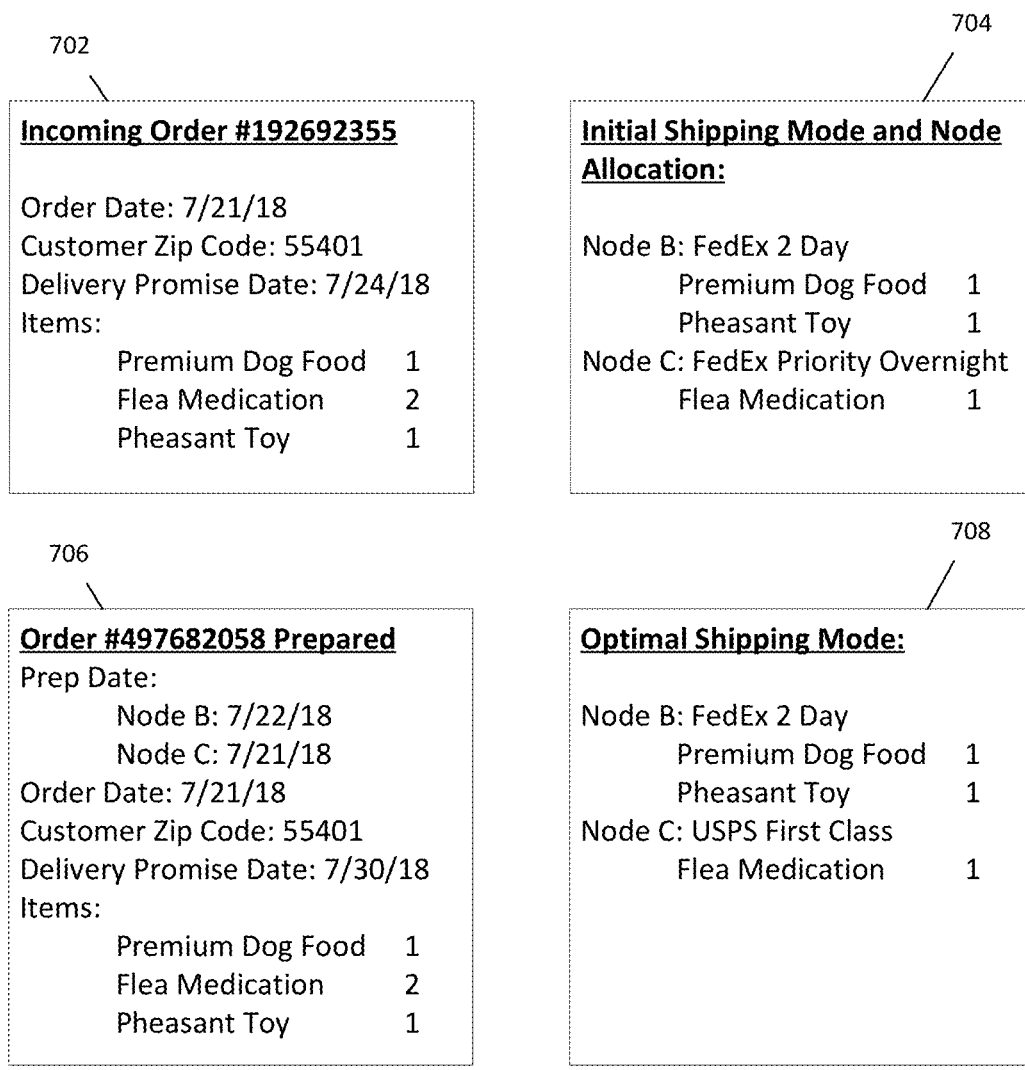
FIG. 7 illustrates additional example views of the graphical user interface of FIG. 6.

Referring now to FIG. 7, example views of a GUI are displayed. The GUI displays information that could be viewed on a computing device to view shipping status. For instance, the GUI could be the retailer GUI 105 of FIG. 1 that would be accessed by a retailer computing device by an employee. In this example, the optimal shipping mode changes because a cheaper shipping option became available between the time that the order was received and the time that the order was prepared for shipment.

The cheaper shipping option could be made available due the order being prepared for shipment in less time than expected, allowing for a slower and less expensive shipping method to be used. Alternatively, preparing the order earlier could allow for a package to be shipped along with multiple others on a schedule instead of being expedited in a separate shipment. Another option is that even if the shipment was prepared in the usual amount of time, the amount of packages that are being sent from a particular node could be enough to meet a volume minimum in order to receive a shipping discount from a particular carrier.

View 702 shows incoming order information displayed on a user interface. The incoming order information includes an order number, order date, customer zip code, and delivery promise date. The information further lists the items in the order and the quantity of each item.

View 704 displays the initial optimal shipping mode that has been selected along with the nodes to which the order has been allocated. In this example, the shipping mode is defined by the carrier (FedEx) and the service type (2 Day) for Node B. A different shipping mode is assigned to Node C.

View 706 shows the confirmation received from the node once the order has been prepared for shipment. The prep date indicates that Node B completed order prep by Jul. 22, 2018 and Node C completed order prep by Jul. 21, 2018.

View 708 shows the final optimal shipping mode selected for the order. In this example, a cheaper shipping option came available by the time the order was prepared for shipment. Node C's delivery mode changes from FedEx Priority Overnight to USPS First Class. The carrier and service type shifted to the cheapest option available to deliver the order to the customer by the promised date.

Referring now to FIGS. 8-16, additional details are provided regarding methods and systems for generating cartonization decisions given the selection of items, item restrictions, carrier restrictions, and variable timing at which carriers or item selections may be modified. As generally discussed herein, because carrier selections are provisionally made at a time of order receipt but may be updated at the time a shipment label is ready to be generated, a cartonization decision may be modified between those times, as an order may change (e.g., due to changes in stock, carrier, or shipping restrictions on items). Still further, cartonization decisions may be based, at least in part, on the location of the item (e.g., the node) and what carton options are available at that node. Accordingly, final cartonization decisions are integrated with shipment label finalization processes to ensure that efficient carton selection decisions are made.

Figure 8:
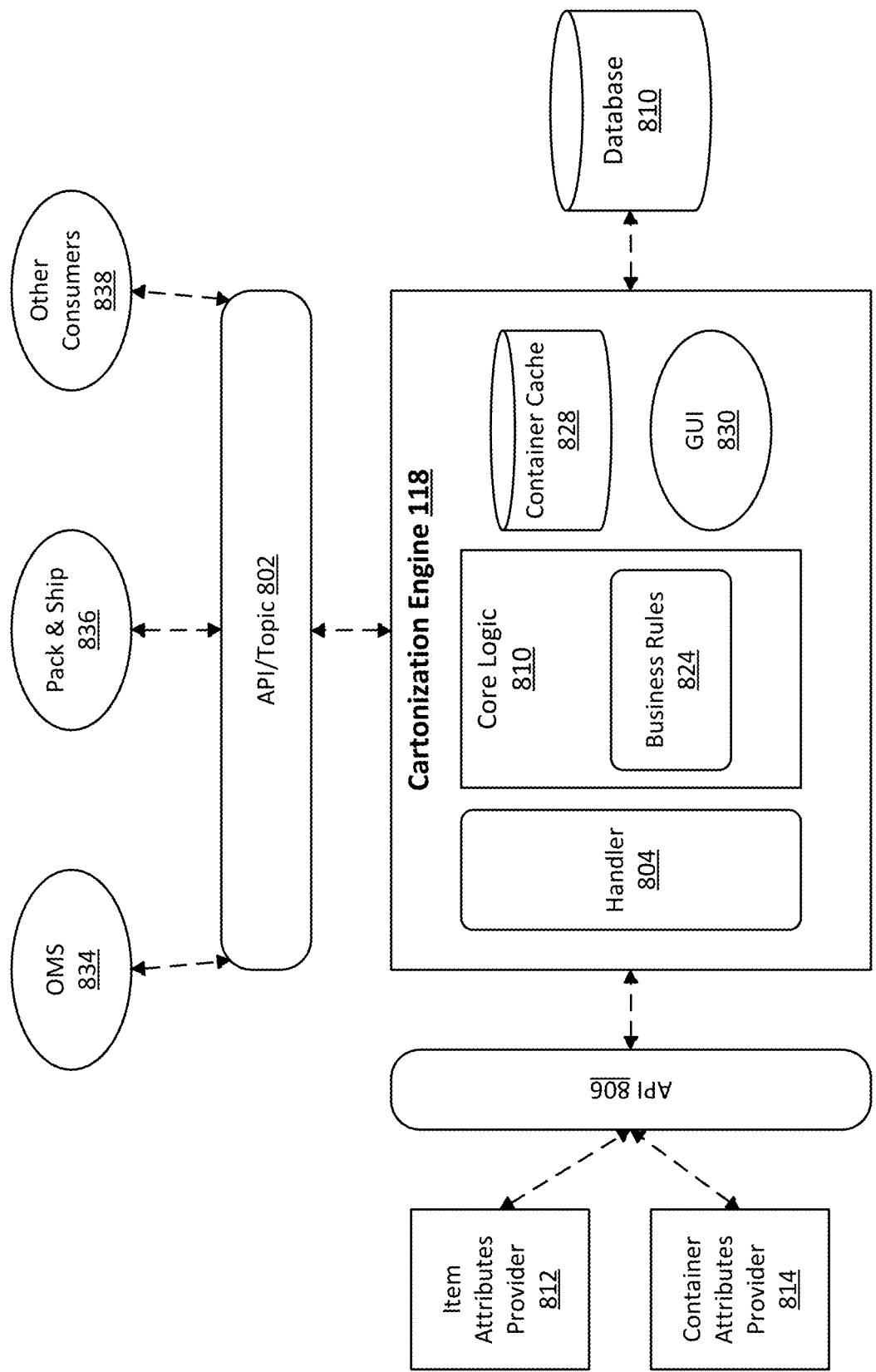
FIG. 8 illustrates a more detailed schematic diagram of the cartonization engine of FIG. 1.

FIG. 8 illustrates a detailed schematic diagram of the cartonization engine 118. As was mentioned above, the cartonization engine 118 operates to determine which packaging to use to ship a set of items. The cartonization engine 118 can also determine how to optimize the use of space in containers other than boxes and envelopes traditionally used for shipping. Other containers include, for example, carts, refrigerators, freezers, and plastic shipping containers. The cartonization engine 118 can calculate the most efficient and cost-effective way to pack one or more items into one or more containers. Additionally, the cartonization engine 118 can operate to display a user interface to a user such as an employee. The user interface can display information about recommended packaging or configuration of items within a container. The cartonization engine 118 can provide a service that is particularly useful at retail stores that ship items to customers.

In the example shown in FIG. 8, the cartonization engine 118 is in communication with one or more consumers via an application programming interface (API) 802. These consumers include an order management system (OMS) 834, a pack & ship system 836, and other consumers 838. The order management system 834 operates to receive online orders from customers and direct other systems to fulfill the orders. The order management system 834 may communicate order information to the cartonization engine 118 such as item identifiers and dates by which shipments are promised to customizers. The pack & ship system 836 operates to manage the packaging and shipping of items to fulfill an order. The pack & ship system 836 may communicate with the cartonization engine 118 to obtain recommendations for placing items into containers for shipping or storage.

The cartonization engine 118 is also in communication with one or more item attributes providers 812 and one or more container attributes providers 814 through another API 806. The handler 804 calls to the information providers through the API 806 as needed to obtain carton and item information. This provides the benefit of not requiring an additional copy of the information to be held at the cartonization engine 118. In other words, up to date information about attributes can be pulled as needed so that there is not a need to continually update a local copy of the attributes. In some embodiments, communication with the providers 812, 814 is accomplished using Kafka topics or REST.

The cartonization engine 118 operates primarily based on its core logic 810. The core logic 810 is responsible for making cartonization determinations such as deciding which items to put into a container to maximize available space or deciding which container to use to ship a set of items to complete a retail order. Key aspects of the core logic 810 are minimizing empty space, minimizing cost, and complying with business rules. A stacking algorithm is employed to implement these key aspects. The empty space is minimized in order to fit as many items as possible into a given container or to use the least amount of packaging possible to ship a set of items. This also aids in minimizing costs. Another consideration to save cost is determining when to split orders into two or more containers. Yet another consideration is determining when items can be shipped in envelopes or bags instead of boxes because envelopes and bags are typically less expensive to ship.

Business rules define other limitations that need to be considered when determining which items can fit into a container or determining which container to select to ship a set of items in a retail order. Business rules may be specific to particular stores, containers, items, etc. For example, business rules can define how fragile items are packaged for shipping or whether particular items need to be separated from one another during shipping. These rules can dictate whether items can be grouped together into one container, whether items need to be oriented in a particular way within a container, whether items need additionally padding or packaging, and whether items can be packaged in boxes vs. envelopes.

In some embodiments, data sources are accessed by the cartonization engine 188 to gather information needed to implement the business rules. For example, item data may be accessed from an inventory system; order data may be accessed from an order management system 834; and lithium data may be accessed from a hazmat API. In some embodiments, different business rules will apply to different containers and items. For example, business rules for storing items in a refrigerator or freezer will likely be different from business rules for shipping items in boxes.

For example, business rules may dictate that items containing liquids must have enough room in a container to be stored upright to avoid spilling during transit. In another example, hazmat or lithium-containing items may need to be shipped separately from other types of items for safety and regulatory reasons. The rules may also dictate which containers are available at a particular store or distribution center. Some other examples of particular business rules include: when to use a specialty box for a particular retail service; when a poly mailer can be utilized for shipping; when an order contains items with both a box and bag designation always cartonize into a box; when an order contains a gift always cartonize to a box and factor in any giftwrap space; when the order contains only items that ship in a bag but cannot fit into the largest bag ship in a box; when an order contains an item marked fragile, factor in void space for dunnage, bubble wrap and other padding; for a single line multi-unit order containing an item where cavity dimensions are maintained, consider that some items can be place inside the other in cartonization (e.g. two storage containers can be stacked); where an item has cavity dimensions, consider that one or more items can be placed inside the item having a cavity (e.g. a shirt and pair of shoes can be placed inside a basket); and food items cannot ship in the same package as hazmat or lithium items.

The cartonization engine 118 communicates cartonization decisions and instructions to a database 810 that can be accessed by other services to fulfill online orders.

The cartonization engine 118 can optionally include a container cache 828 and a graphical user interface (GUI) 830. The container cache 828 operates to locally store container attribute information for quick access by the cartonization engine 118. The container cache 828 may be useful for a particular retail location that works with a particular subset of containers on a regular basis. Each retail location could have its own unique set of containers available to it and rates for shipping those containers that change over time. The cache can operate to narrow down the container options to those available to a user as well as to eliminate the need for the handler 804 to fetch container attribute information for each cartonization determination. However, even if a container cache 828 is present within the cartonization engine 118, the handler 804 could still obtain other container attribute information from the container attributes provider 814 upon request.

The GUI 830 operates to display information to a user. Typically the user would be an employee or other individual that is placing items into a container. For example, an employee might be selecting a type of package to use for preparing an order for shipment that includes multiple different items. In another example, an individual might be selecting items from shelves of a store to prepare an order and placing those items in a cart to transport them to a shipping area. The GUI 830 can display information about which type of container to use or which combination of items will best fit into a cart. Example displays of the GUI 830 are provided in FIGS. 13A and 13B.

In some embodiments, the GUI 830 may not be necessary if cartonization information is being directly communicated to a computerized machine that is placing items into containers. For example, a robot could receive the carton recommendation from the cartonization engine 118 directly and use that information to retrieve the correct container to package items in a customer order.

The GUI 830 can further provide information to a user about how to configure items within a container. The GUI 830 could present a visual display depicting how to place different items into a container to maximize the available space in the container. In some embodiments, the GUI 830 can also be configured to display locations of items within a retail store to aid in the picking process. The GUI 830 may be displayed on a computing device such as the computing device 400 described in FIG. 4.

Figure 9:
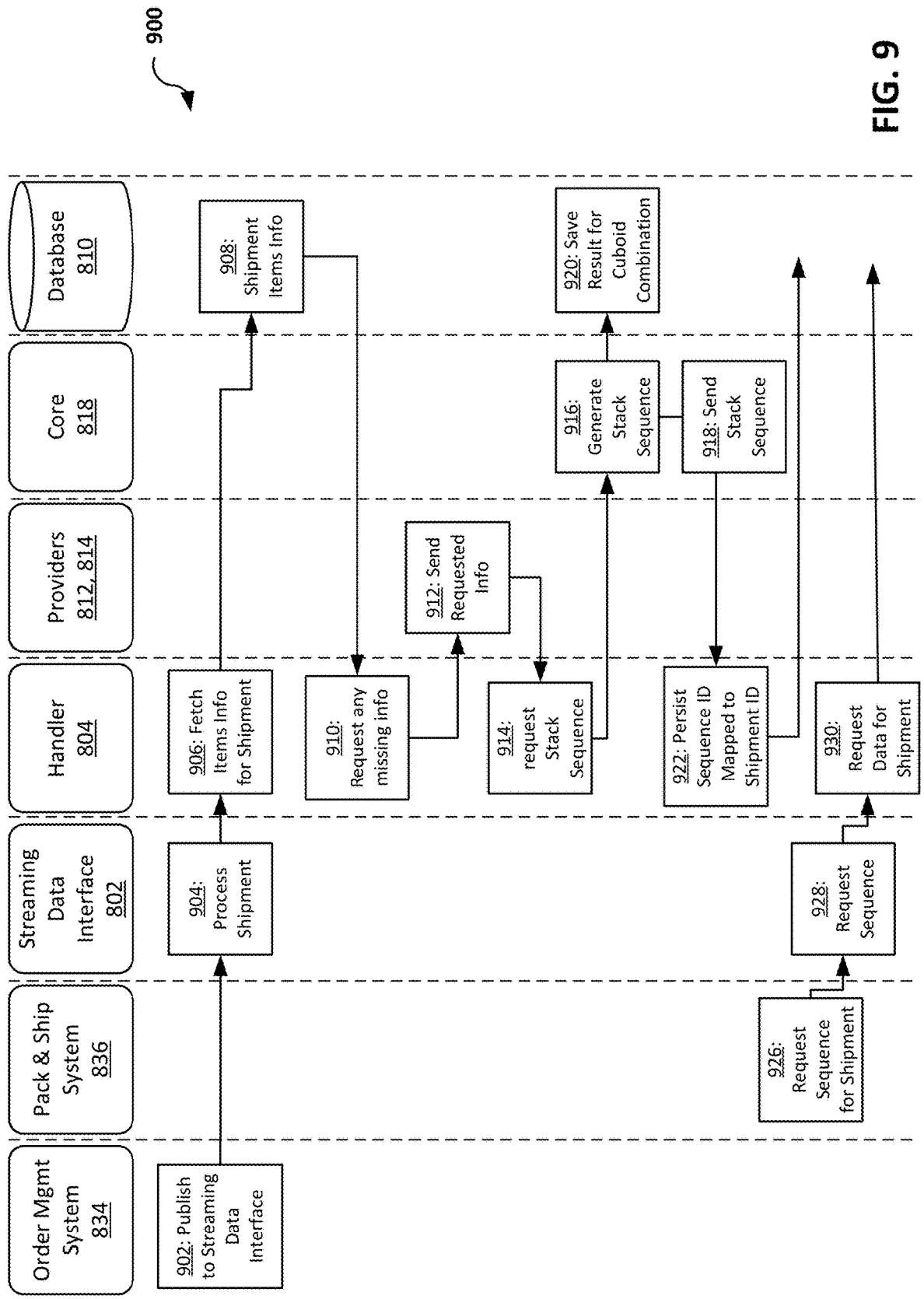
FIG. 9 illustrates a flow diagram of an example method of processing items for shipment.

FIG. 9 illustrates a flow diagram 900 of a method of processing items for shipment. An enterprise computing system is utilized to implement this method. The enterprise computing system in the example of FIG. 9 includes an order management system 834, a pack & ship system 836, a streaming data interface 802, a handler 804, providers 812, 814, the core 818 of the cartonization system, and a database 810.

The order management system 834 may perform similar tasks to the online ordering system 104 or delivery mode optimizer 108 of FIG. 1. The order management system 834 operates to manage shipments of items to fulfill customer orders for retail goods.

The pick & ship system 836 may perform similar tasks to the pick & pack engine 120 of FIG. 1. The pick & ship system 836 operates to manage the process of picking items from storage and store shelves and then packaging those items for shipment to customers.

The API/Topic 802, handler 804, providers 812, 814, and core 818 are described above in reference to FIG. 8.

At operation 902, the order management system 834 publishes an order to a streaming data interface 802. At operation 904, the shipment is processed at the streaming data interface 802. The shipment includes information about the items to be included in the shipment. This information could include item identifiers such as alpha-numeric item codes that can be used to look up information about each item.

At operation 906, the handler 804 fetches attribute information for the items to be included in the shipment. This information is fetched from the database 810 at operation 908. In some embodiments, information is requested using a shipment ID, location, and item IDs. In response, the shipment ID along with item attributes are received.

At operation 910, the handler 804 requests any missing information that is needed to process the shipment. Missing information could be information that has been updated but not stored in the database 810. This request is sent to the providers 812, 814, which send the requested information at operation 912. In some embodiments, the requests are communicated through an API using REST or Kafka topics.

At operation 914, a stack sequence is requested through the handler 804. At operation 916, stack sequence is generated at the core 818 and sent to the handler 804 at operation 918. Additionally, at operation 920, the result is saved for cuboid combination, which determines how the items may fit within a given volume based on dimensions of each item.

At operation 922, the sequence ID for the generated stack sequence is mapped to a shipment ID for the shipment at the handler 804. This is persisted to the database 810.

At operation 926, a request for the shipment sequence is made by the pack & ship system 836 to the API/Topic 802. At operation 928, the API/Topic 802 forwards the request to the handler 804. At operation 930, the handler 804 requests data for the shipment from the database 810.

In some examples, the request will include a shipment ID, an external shipment ID, a location ID, and shipment Lines. The request asks for a Shipment Line ID, an external shipment line ID, an item identifier, and a quantity. In response, the shipment ID, external shipment ID, number of cartons, and carton details will be provided along with carton ID, carton type, carton weight, and carton lines. Finally, the shipment line ID, external shipment line ID, item identifier, and quantity will be provided.

Figure 10:
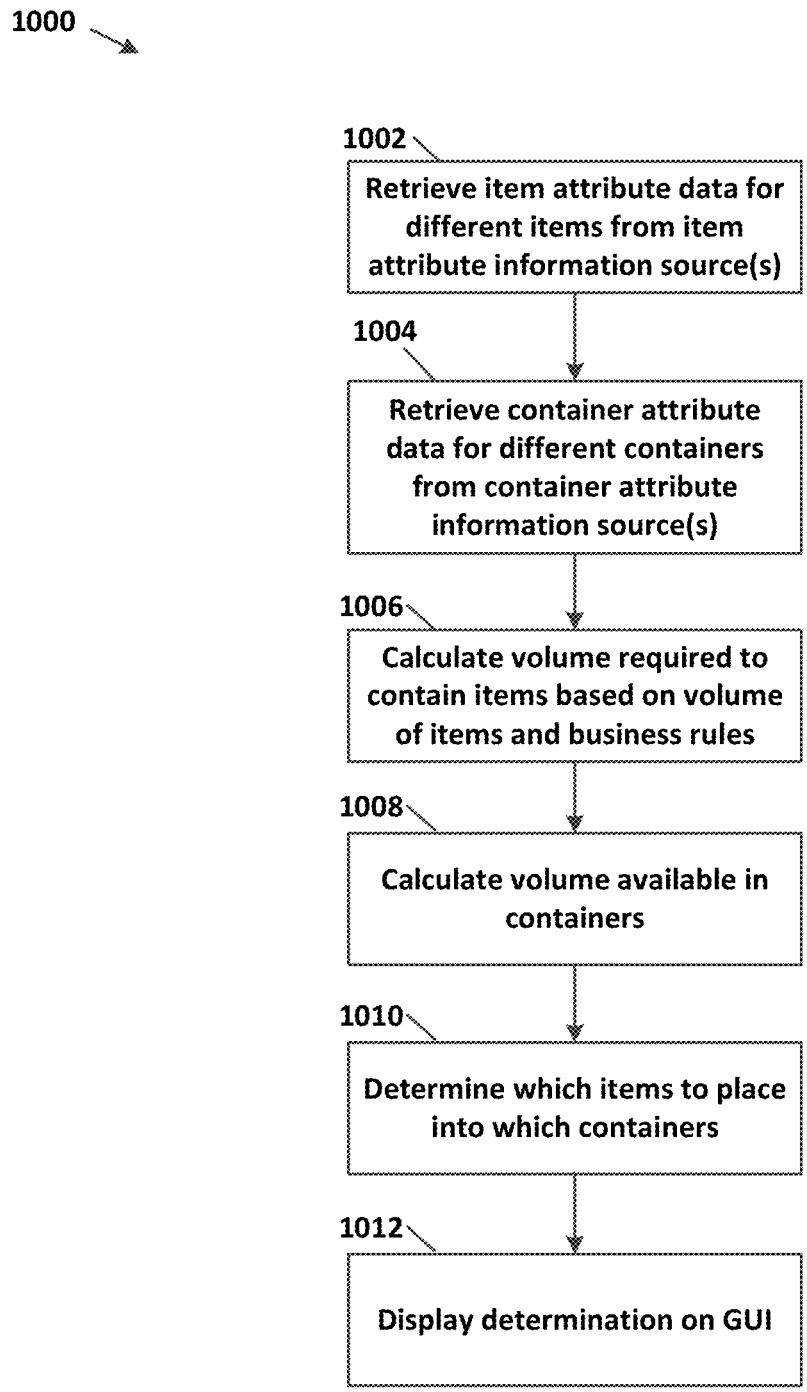
FIG. 10 illustrates a flow diagram of an example method of cartonizing items for shipment.

FIG. 10 illustrates a flow diagram of an example method 1000 of cartonizing items for shipment. In some embodiments, this method 1000 is performed by the cartonization engine 118 of FIGS. 1 and 8. This method can be utilized to determine how best to use available space within a carton, package, or container. In some embodiments, this method is also utilized to reduce shipping costs by determining the minimum packaging required to fit a number of items such that shipping costs are minimized. In some embodiments, the method 1000 is performed at a retail store that is preparing items to ship from the store to customers.

At operation 1002, item attribute data is retrieved for one or more of a plurality of different items from one or more item attribute information sources. The item attribute information sources are accessed by the cartonization engine 118 through an API 806. In some embodiments, the item attribute information sources are housed external to the cartonization engine. Other computing services and databases may have the most up-to-date information about item attributes. The API 806 fetches data from those sources as needed in order to ensure that the information is accurate. The item attribute data does not need to be stored locally for the cartonization engine 118 to use. By avoiding replication of the item attribute data, the computing system that is making cartonization determinations operates more efficiently than existing systems. In some embodiments, the item attribute data includes volumes of the one or more of the plurality of different items. In some embodiments, the item attribute data further includes information about the shipping and handling requirements of the items, how fragile the items are, whether the items include hazmat materials or lithium, whether the items need to be stored in a temperature- or climate-controlled environment, dimensions of the items, weight of the items, whether the items can be nested within one another, and whether the item comes in its own box that can be used for shipping.

At operation 1004, container attribute data is retrieved for one or more of a plurality of different containers from one or more container attribute information systems. Examples of container types include boxes, bags, hold locations, carts, pallets, and totes. The container attribute data is fetched from one or more sources using the API 806. Similar to the item attribute data, the container attribute data can be fetched on an as-needed basis so that the container attribute data does not need to be replicated and stored locally at the cartonization engine 118. However, in some embodiments, a cache of container attribute data may be stored at the cartonization engine 118 for containers that are available or are frequently used at a particular retail location. In some embodiments, a container cache is configured to store container attribute information for containers that are available at a particular retail facility. The container cache 828 can be accessed through the user interface 830 to quickly view available cartons and their attributes. The list of containers stored in the cache can be modified through the user interface 830, for example, when a retail location discontinues use of a particular container or adds a new type of container. In some embodiments, the container attribute data includes interior dimensions of the one or more of the plurality of different containers.

At operation 1006, a volume of space required to contain the one or more of the plurality of different items is calculated based on the volumes of the one or more of the plurality of different items and a set of business rules governing compatibility of items and containers.

At operation 1008, volume of space available in the one or more of the plurality of different containers is calculated. In some instances, the available volume of space is an attribute of the container that can simply be accessed. In other instances, the volume can be calculated from interior dimensions of the container. In yet other instances, some of the volume of a container may already be occupied by one or more items and the remaining volume is calculated based on the container's interior dimensions and the volume of the items already occupying the container. In some instances, additional packaging or padding may need to be accounted for within the container and will result in less available volume for items to occupy within the container.

At operation 1010, it is determined which of the one or more of the plurality of different items to place into the one or more of the plurality of different containers. Based on the volume of the items, the available space in the containers, and the business rules applicable to the location, items, and containers, it is determined which items are to be placed in which containers. In some embodiments, it is also determined which arrangement and orientation the items will have within the container and with respect to one another. In some embodiments, business rules are customized for a particular retail facility.

Figures 13A, 13B:
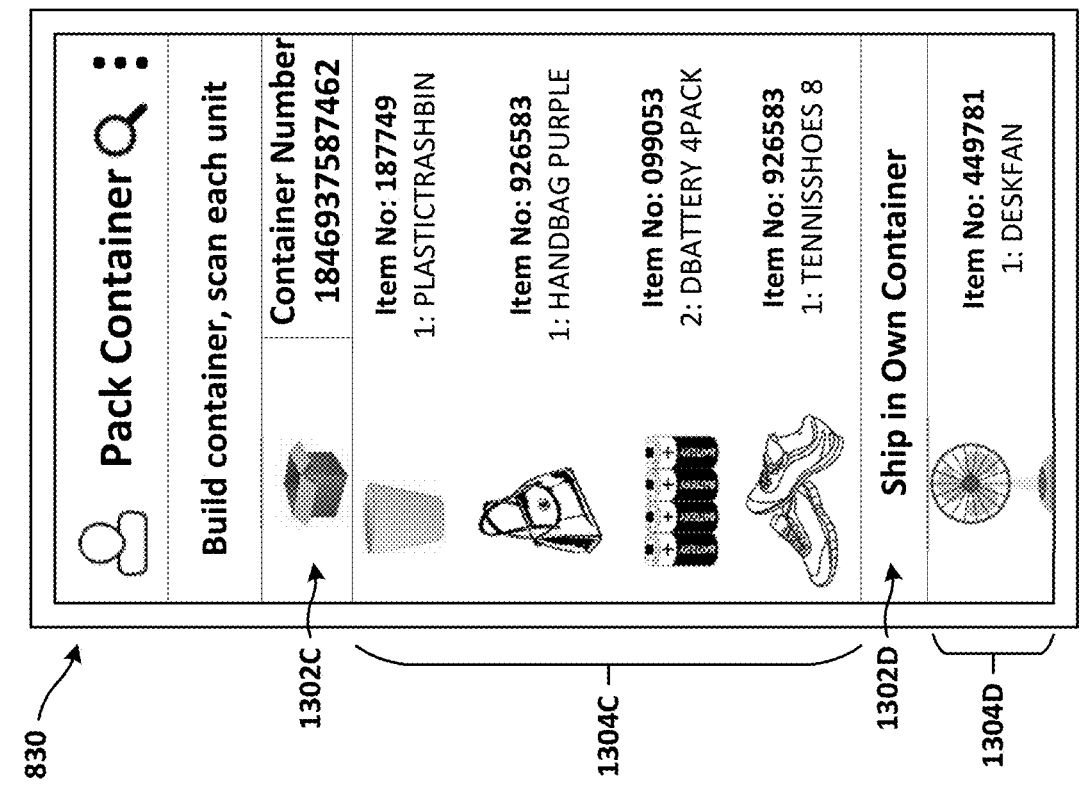
FIGS. 13A and 13B illustrate example graphical user interfaces displaying instructions for packing items into containers.

At operation 1012, the determination is displayed on a graphical user interface (GUI). The GUI can display information about the items and containers and how the items will be arranged within the containers. Different means of displaying this information are possible. In some embodiments, visual representations of the items and containers are displayed on the GUI. One example is shown in FIGS. 13A and 13B. In some embodiments, the GUI is configured to display a display illustrating how to place the items in the cartons to maximize space and save on shipping costs. Additionally, cartonization determinations can be saved to a data layer that is accessible by other services via an API.

FIG. 11 illustrates a table 1100 of container attributes. A plurality of rows 1102 represent different containers that are available for packaging items to fulfill a retail order shipment. Each column provides a different piece of information about each container. In the table 1100 of FIG. 11, the columns include container ID 1106, container type 1108, container number 1110, maximum volume of the container 1112, actual volume of the container 1114, expected volume of the container 1116, maximum weight capacity of the container 1118, empty weight of the container 1120, length of the container 1122, width of the container 1124, and height of the container 1126. Additional container attributes can include: percent fill, active from date, by node setting, cartonize to unit volume, item ships in own container The container ID 1106, container type 1108, and container number 1110 are used to identify each container. In this example, the container ID 1106 identifies a set of data for a particular container. The container type 1108 specifies whether the container is a box or bag (other packaging types are possible such as envelopes). The container ID 1106 lists the ID number of each type of container. In some embodiments, the container ID 1106 and container number 1110 are the same, and only take up one column. In the example of container ID 3, the container is a box with container number 413. Container ID 12 is a bag having container number 340.

The maximum volume of the container 1112, actual volume of the container 1114, and expected volume of the container 1116 provide different measurements of the container's volume. The volume in the table 1100 is provided in cubic inches. In some instances, such as container ID 3, these measurements are equal for each. For container ID 4, the expected volume 1116 differs from the max volume 1112 and actual volume 1114 of the container.

The maximum weight 1118 describes the most weight that the container can hold. The empty weight 1120 of the container is how much the container weighs by itself. In the example of ID 5, the box weighs 1.85 ounces and can hold up to 60 pounds. For ID 12, the bag weighs 0.13 ounces and can hold up to 40 pounds.

The length 1122, width 1124, and height 1126 provide the dimensions of the container. In the example of FIG. 11, these dimensions are provided in inches. So for ID 6, the box has a length of 28.63 inches, a width of 19.63 inches, and a height of 13.25 inches.

Figure 12:
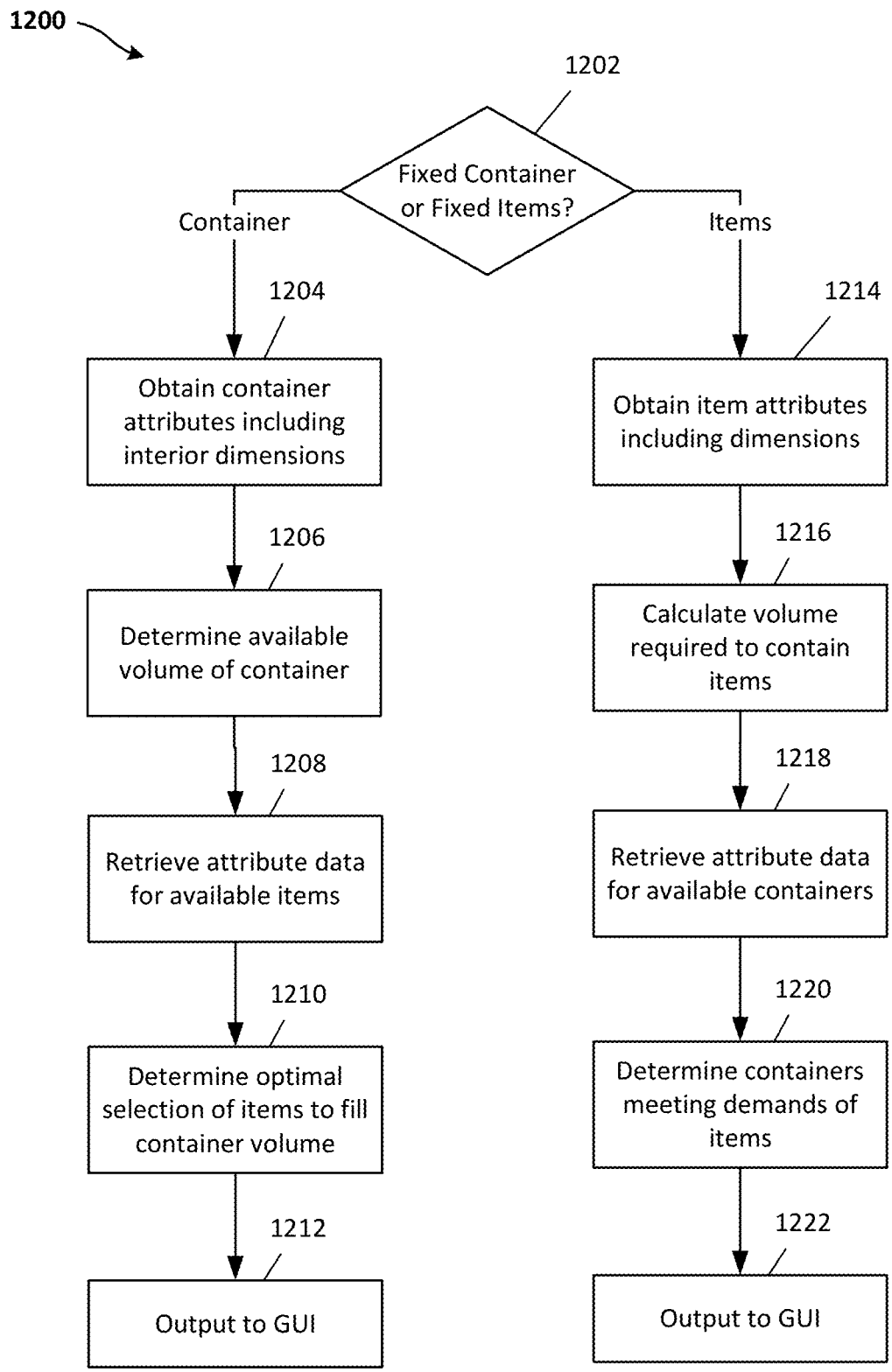
FIG. 12 illustrates a flow diagram describing an example method of optimizing item placement in containers.

FIG. 12 illustrates a flow diagram describing an example method 1200 of optimizing item placement in containers. In some embodiments, this method is performed by the cartonization engine 118 of FIG. 8.

At operation 1202, a selection is received indicating that cartonization is going to be performed with respect to a fixed container (or containers) or a fixed set of items. The cartonization engine 118 can optimize the use of available space in a given volume (a specified container) or can select the smallest, most cost-effective container to contain a given volume (a specified set of items) without having wasted space. If a user is interested in determining how best to utilize the space of a container such as a refrigerator, a freezer, or a picking cart, a selection is made that indicates that a fixed container is being optimized. The method then proceeds to operation 1204, where the maximum amount of items from a given collection are selected to be housed in the specified container. If, however, the user has a set of items that are all part of one retail order that is to be shipped, a selection is made that indicates that a fixed set of items are being optimized. The method then proceeds to operation 1214, where the most cost-effective container type is selected that will properly package the items.

At operation 1204, container attributes are obtained. In some embodiments, a handler fetches container information from a provider. In some embodiments, the handler 804 of FIG. 8 fetches container attribute information from a container attributes provider 814. In some embodiments, container attribute information is cached locally in the container cache 828 to make it easier to access by the core logic 818 of the cartonization engine 118. This works well for retail locations that typically use the same type of containers over and over again.

The container attributes can include height, length, width, weight of the container, maximum weight the container can hold, interior volume of the container, container identifier, and container type. In some embodiments, the container attributes can include information about which container types are compatible with particular carrier types. This information can be utilized to make cartonization determinations that are compatible with carrier selections to determine an optimal shipping mode for an order.

In some embodiments, a user can select a particular container such as a cart or storage holding container. In some embodiments, the container is a picking cart and the items to be contained are items to be picked for fulfilling a customer order. In some embodiments, the container is a temperature-controlled storage container or a climate-controlled storage container. This may be used for storing items such as groceries.

In some embodiments, a user can select a subset of containers from a list of available containers at a particular retail location. For example, a particular retail store may have 7 different boxes and 3 different bags available for shipping items to customers. Each of the different boxes and bags have different dimensions. An employee may determine that a shipment should be completed using one of 3 different boxes. Those boxes can be selected before container attributes are retrieved for the cartonization determination. Users can also supply their own custom container dimensions and specifications.

Examples of container types that might be selected other than boxes and bags include picking carts, climate-controlled storage containers, refrigerators, and freezers. Therefore, the cartonization engine 118 can not only determine a final shipment container, but also determine an in-store move container or temporary storage container that may be used by itself, or in conjunction with, the shipment. For example, items for an order may be picked into a first container (cart) and shipped in a second container (box).

In some embodiments, a particular container can be selected from two or more containers of the same type. For example, if a retail facility has three different refrigerated storage units that are different sizes, a user could specify that they want to optimize the use of space in "SW Fridge" to store items that need refrigeration, while the "NE Fridge" and "NW Fridge" are not selected. Alternatively, a user could select to have a set of items be cartonized into two or more containers. For example, a user could select to optimize the storage space of a set of items to be stored in both "SW Fridge" and "NW Fridge."

At operation 1206, available volume within the container (or containers) is determined. Generally, this volume will be the same as the interior volume of the container that is supplied at operation 1204. However, in some instances some of the volume may be already be occupied by other items. In some instances, two pending orders can be linked and shipped in the same carton.

At operation 1208, attribute data for the available items are retrieved. In some embodiments, available items include those that are to be picked to complete one or more orders. Items from two or more orders could be housed within the same storage container such as a picking cart. In some embodiments, item attribute data is fetched by a handler. The handler 814 of FIG. 8 may fetch item attribute data for a set of items from an item attribute provider 812. In some embodiments, the item attribute provider 812 is an item database containing information captured for items upstream within the supply chain Item attributes can include height, width, length, weight, fragility, packaging requirements, storage requirements, whether the item includes liquids, whether the item includes hazardous materials, whether the item includes lithium, and whether the item can be nested.

At operation 1210, an optimal selection of items is determined to fill the available container volume. In some embodiments, the core logic 818 of the cartonization engine 118 calculates available space within the container(s), applies business rules to the available items, and determines which items can be placed into the container(s) in the available space and in compliance with the business rules. The business rules 824 can be modified by a user to match the capabilities of a retail location or to reflect updated storage policies. Additionally, the business rules may be different depending on the type of container that is being cartonized. For example, a rule requiring hazmat items to be shipped separately from food items would apply to shipping containers but not to picking carts or storage holding areas. In some embodiments, a user can choose to apply or not apply particular business rules to a particular cartonization process.

At operation 1212, the optimal selection is output to a graphical user interface (GUI). In some embodiments, information about the items and container are generated on the GUI 830 of FIG. 8 which is communicated through a network to a display of a computing device such as the computing device 400 of FIG. 4. In some embodiments, the GUI displays a diagram indicating how the items are to be arranged within the container to maximize the available space.

Returning to the branch of the method where the items are fixed, the method proceeds to operation 1214. Item attributes are obtained for the fixed set of items. The item attributes include at least the dimensions of each item. In some embodiments, the item attributes can further include one or more of the following: height, width, length, weight, fragility, packaging requirements, storage requirements, whether the item includes liquids, whether the item includes hazardous materials, whether the item includes lithium, and whether the item can be nested. In some embodiments, the item attributes are fetched by the handler 804 via an API 806 from an item attributes provider 812.

At operation 1216, a volume required to contain the items is calculated. Using the dimensions of the items, a total volume required to contain the items is calculated by the core logic 818 of the cartonization engine 118. In some embodiments, business rules are applied to determine whether additional space is needed to package the items. For example, if a particular item is fragile and requires extra padding, additional space will be needed within a container to hold the item securely.

At operation 1218, attribute data for available containers is retrieved. In some embodiments, only a subset of containers will be available at a particular retail location. The subset can be selected manually by a user or be automatically selected by default. In some embodiments, a user can manually supply attributes of a custom container. In some embodiments, the container attributes are fetched from a container attributes provider 814 through an API 806 by the handler 804. In some embodiments, the container attributes are accessed from a local container cache 828.

At operation 1220, containers meeting demands of items are determined. In some embodiments, the core logic 818 of the cartonization engine 818 of FIG. 8 utilizes the item attributes, container attributes, and business rules to determine which container or containers will hold the requested set of items while providing enough packaging to ship them safely. The core logic 818 considers how much unused space will be left in a container after items are place into the container and will select the container with the least amount of unused space. Typically, the most items possible will be placed into a single container. Sometimes it may be advantageous to select two smaller containers instead of one larger container. Additionally, the core logic 818 considers the cost of shipping a particular container and will select the container with the lowest cost of shipping. For example, an envelope or bag will typically be less expensive to ship than a box. Finally, the business rules are considered to determine if items need to be positioned in a particular orientation inside of a carton, determine if the item can be shipped in a bag instead of a box, determine whether additional padding is needed, or determine if particular items need to be shipped in separate containers from other particular items.

At operation 1222, the determined containers are output to a GUI. Example views of such a GUI are shown in FIGS. 13A and 13B. In some embodiments, the GUI 830 communicates a display to a computing device of the items and which containers to place them into. In some embodiments, the display provides a diagram illustrating to a user how to place the items within the container to maximize the use of space and comply with business rules.

FIGS. 13A and 13B illustrate displays of an example GUI 830 that could be displayed on a computing device that is operated by a user. A user might access the GUI 830 to get instructions on how to pack items from a retail store for shipment to a customer. In these examples, the GUI 830 displays container information 1302 in the form of a visual representation of the container and a container number. Additionally, item information 1304 is shown as a visual representation of the item, an item number, a quantity, and a brief written description of the item. In this example, one customer order is displayed on the GUI 830 at a time.

In the example of FIG. 13A, container information 1302A for a first container is displayed indicating that the first container is an envelope having container number 1946948587090. Underneath the container information 1302A is item information 1304A corresponding to three items that are to be packaged in the first container. In this example the first item is a t-shirt that is indicated with a picture of the t-shirt, the item number 836587, a quantity of 1, and a description of "TSHIRT XL." In this example, another container is required to ship the remaining items in the customer order. Container information 1302B for a second container is displayed with corresponding item information 1304B beneath it. The item information 1304B includes visual alerts 1308 indicating that special handling is required for those items. In this example, the dish detergent and bleach are liquid items that need to be shipped upright. Therefore, these items are recommended to be shipped in a box, as indicated by the container information 1302B. The items associated with the first container are assigned to a shipping envelope because it was determined that this would be more economical. Additionally, business rules could require that liquid-containing items be shipped separately from non-liquid-containing items.

In the example of FIG. 13B, cartonization instructions for a different customer order are displayed. Container information 1302C for a third container is provided indicating that the items should be packaged in a box having container number 1846937587462. Item information 1304C for the items that are to be packaged in the third container is displayed under the container information 1302C. Other arrangements of the information are possible. In this example, if there was a business rule in place specifying that lithium-containing items cannot be packaged with food items, and if the order included food items, the food items and batteries would have to be separated into different containers. Also in this example, if business rules are applied indicating that items having cavities can contain other items, the instructions might indicate that one or more of the handbag, batteries, or tennis shoes could be placed inside of the plastic trash bin to conserve space inside of the box. The order in FIG. 13B also includes container information 1302D for a fourth container. The corresponding item information 1304D indicates that the item is a desk fan having item number 449781. This item ships in its own container, as indicated by the container information 1302D. Therefore, additional packaging is not required.

Figure 14:
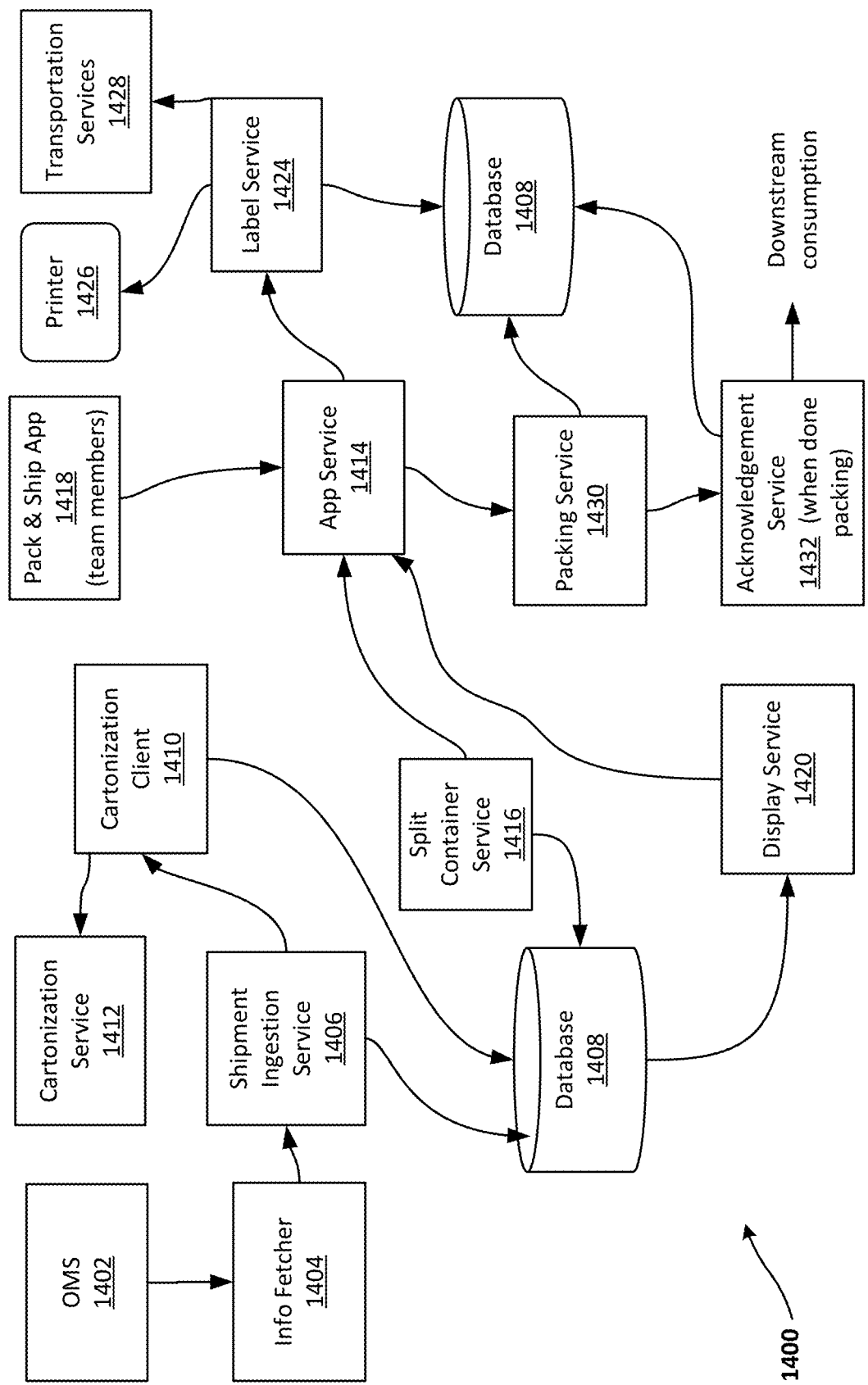
FIG. 14 illustrates a schematic diagram of an order fulfillment system.

FIG. 14 illustrates an example order fulfillment system 1400. The order fulfillment system 1400 includes multiple services operating to communicate various order fulfillment events to different systems and databases.

The order management system (OMS) 1402 operates to receive online customer orders and process those orders for fulfillment. In some embodiments, the OMS 1402 may be the same as the OMS 834 of FIG. 8. The OMS 1402 collects information regarding items in each customer order and other details of the order such as a promised delivery date and the delivery address.

An information fetcher 1404 retrieves information about an order from the OMS 1402. This information includes item information such as quantities and identifiers for items, item dimensions and weight, as well as packing requirements for the items. The information fetched by the information fetcher 1404 is passed on to the shipment ingestion service 1406. In some embodiments, the item fetcher 1404 is a message routing engine using an application programming interface (API) such as Apache Camel™.

The shipment ingestion service 1406 operates to process information about each order and the items in the order. This service communicates order and item information to the database 1408 where it is stored for later use by other services. Item attribute information and information about the total items in an order are communicated to the cartonization client 1410. The cartonization client 1410 communicates item and order information to the cartonization service 1412. Cartonization information such as the types of cartons selected to package an order are saved to the database 1408. Note that the database 1408 is shown in two places in FIG. 14 for ease of viewing and understanding, but there is actually only a single database 1408.

The cartonization service 1412 operates to determine the optimal configuration of packaging needed to ship a group of items in a customer order to minimize cost. In some embodiments, the cartonization service 1412 utilizes the cartonization engine 118 of FIG. 8. The cartonization service 1412 relies on information received from the cartonization client 1410 to make decisions about which types of cartons to use and how the items will be distributed to those cartons.

The application service 1414 operates to coordinate communications between the pack & ship app 1418 and various services. In the example of FIG. 14, the application service 1414 is in communication with the split container service 1416, the display service 1420, the label service 1424, and the packing service 1430.

The split container service 1416 operates to determine when an order should be split between two or more containers for shipping. The order needs to have at least two items that are being shipped to a customer. The split container service 1416 calculates the cost of shipping the order in two or more containers as compared to shipping all of the items in the order in a single container. This determination could change as carrier rates change or if an order needs to be expedited. Additionally, the split container service 1416 may split an order if some items are available to ship sooner than others. The split container service 1416 communicates its determinations to the app service 1414 so that it can be communicated to the pack & ship app 1418. Additionally, the determination is stored in the database 1408 so that the information can be used by other services.

The pack & ship app 1418 is a software application designed for use by employees of a retailer that is preparing orders to ship to customers. In some embodiments, the orders are placed online and are shipped to the customers. The pack & ship app 1418 communicates information about the order, the items in the order, and the cartonization instructions for the order to a computing device operated by an employee. In some embodiments, the computing device is a hand-held device such as a tablet computer, personal digital assistant, or smart phone. Examples of displays that could be viewed on the pack & ship app 1418 are shown in FIG. 16.

The display service 1420 generates displays of information received from the database 1408. Such information could include item identifiers, item images, item descriptions, carton identifiers, carton images, order identifiers, order information, and other information relating to customer orders. Text and graphical representations of the information are generated and communicated to the app service 1414 from the display service 1420. These displays are used on the pack & ship app 1418 to communicate order information to employees.

The label service 1424 operates to generate labels that will be affixed to containers for shipping. The label service 1424 receives order information through the app service 1414 and uses that information to generate labels including text and barcodes that will be used by carriers for identifying and routing packages. The label service 1424 communicates the labels to a printer 1426 to produce the physical labels that will be affixed to packages. The label service 1424 also communicates the labels to transportation services 1428 so that the shipments can be managed and tracked. In some embodiments, the labels include tracking numbers that can be used to monitor the packages location and progress during shipment.

The packing service 1430 operates to manage the process of packing items into containers. The packing service 1430 receives information from the database 1408 via the app service 1414 relating to orders that need to be fulfilled. This information includes order identifiers, item identifiers, and cartonization instructions. This information is utilized by an employee (using the pack & ship app 1418) to prepare packages for shipment. The packing service 1430 receives communications from the pack & ship app 1418 via the app service 1414 indicating that the employee has finished packaging all of the items in an order and the order is ready to ship. The packing service 1430 communicates this information to the database 1408 and an acknowledgement service 1432. The acknowledgement service 1432 communicates confirmation of shipping to downstream consumers so that they can monitor the progress of package shipping.

Figure 15:
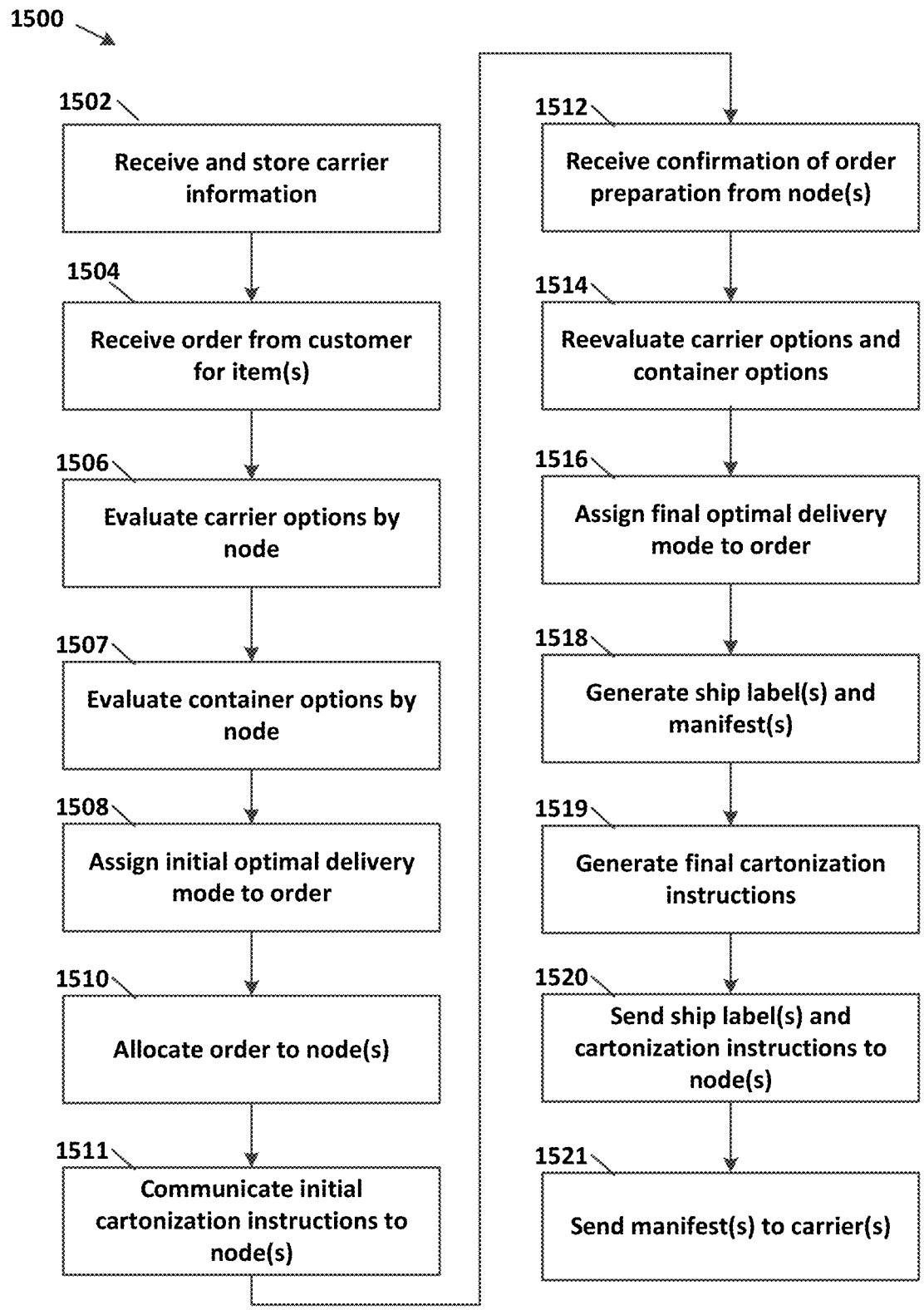
FIG. 15 illustrates a flow diagram describing an example method of optimizing delivery of orders to customers.

Referring now to FIG. 15, a method 1500 of optimizing delivery of orders is described. This method 1500 is similar to the method 500 described in FIG. 5 except that in this example, the cartonization instructions are also updated when the final optimal delivery mode is determined.

At operation 1502, carrier information is received and stored. The carrier information can include some or all of the following: carrier rates 202, carrier services 204, carrier zones 206, carrier time in transit tables 208, carrier calendars 210, and O/D pair alignments 212. In this embodiment, the carrier rates 202 are specific to particular shipping container types.

At operation 1504, an online order is received from a customer for one or more items. The item descriptions, quantities, delivery address, and desired shipping speed are extracted from the orders at the online ordering system 104. This information is forwarded to the delivery mode optimizer 108. In some embodiments, an order management system 834 receives the order information and manages the communication of that information to other systems to fulfill the order. In some embodiments, this function is performed by the order management system 1402 of FIG. 14.

At operation 1506, carrier options are evaluated by node. The delivery mode optimizer 108 receives the order information and accesses the carrier data store 112 to analyze carrier information. The carrier evaluation module 220 analyzes the costs and times calculated by the cost calculator 216 and time calculator 218 to determine initial optimal delivery modes available for one or more nodes.

At operation 1507, container options are evaluated by node. The containers available may differ at each node within a retail supply chain. The cartonization engine 118 determines which combination of containers are optimal for shipping the items in an order. The carrier rates for each container and for each node are taken into account to determine how to place items into containers for shipping.

At operation 1508, an initial optimal delivery mode is assigned to the order. The initial optimal delivery mode specifies the carriers, nodes, and cartons that will be used to fulfill the order. More than one node may be utilized to provide items fulfill the order. More than one carton may be selected to package the items in the order to minimize the cost of shipping. More than one carrier may be utilized to ship the order. Cartonization instructions are generated according to the initial optimal delivery mode.

At operation 1510, the order is allocated to one or more nodes in the supply chain. Once the order is allocated to one or more nodes, the order information is sent to the selected node(s).

At operation 1511, the cartonization instructions for the initial optimal delivery mode are communicated to the one or more nodes that will provide items to the fulfill the order. At the node, the order is picked and packed according to the cartonization instructions.

At operation 1512, confirmation of order preparation is received from the one or more nodes. The confirmation includes a request to reevaluate delivery modes. In some embodiments, the confirmation is sent from the pick & ship app 1418 of FIG. 14 or the pick & ship service 836 of FIG. 8.

At operation 1514, the carrier options and container options are reevaluated. Using the same methods as before, the delivery mode optimizer 108 and cartonization engine 118 analyze the carrier information. The analysis is updated based on any changes that have occurred between the time the order was first received and processed and the time that the order was prepared for shipment. In some instances, the order will be prepared in more or less time than expected and the available shipping options will be different. In other instances, the carrier rates will have changed, making the choice of carrier and/or cartons change to optimize costs.

At operation 1516, a final optimal delivery mode is assigned to the order. The delivery mode optimizer 108 determines if the initial optimal delivery mode should be changed. If so, a different final optimal shipping mode is assigned and communicated to the node where the order was prepared for shipment. Similarly, the cartonization engine 118 determines if there is a more efficient and cost-effective way to distribute the items of the order into one or more containers.

At operation 1518, a ship label and manifest for the order is generated. The ship label and manifest generator 114 generates the ship label and manifest. The ship label reflects the final optimal delivery mode.

At operation 1519, final cartonization instructions are generated. The cartonization engine 118 may make the cartonization determination.

At operation 1520, the ship label and cartonization instructions are sent. The ship label is sent to the node for application to the package containing the ordered items. Additionally, the cartonization instructions are communicated to employees at the nodes fulfilling the order through the pack & ship app 1418 or similar software applications.

At operation 1521, the manifest is sent to the carrier(s) that will ship the order. The carrier(s) will then pick up the packages containing the ordered items and transport them from the nodes to the specified customer address.

Referring now to FIG. 16, example views of a GUI are displayed. The GUI displays information that could be viewed on a computing device to view shipping status and cartonization instructions. In this example, a change in carrier rates has prompted the order to be fulfilled by an additional node using different carrier types. This, in turn, has prompted the cartonization decisions to change to the most cost-effective option.

View 1602 shows order information for an incoming customer order. The information displayed includes an order date (Jul. 25, 2019) and the zip code of the delivery destination (51466). The delivery promise date (Jul. 30, 2019) is provided along with a list of the items in the order.

View 1604 shows the initial optimal delivery mode selected for the order. In this embodiment, the optimal delivery mode specifies the carrier, node, and container that will be used to fulfill the order. This order has been allocated to Node A. USPS has been selected as the carrier with Retail Ground as the service type. All of the items have been cartonized into Box A197.

View 1606 shows the order preparation confirmation. The order prep date indicates that the order was prepared by Jul. 27, 2019. This view also shows the items in the order and the customer's zip code.

View 1608 shows the final optimal delivery mode selected for the order. In this example, there was a change in carrier rates. As carrier rates changed, it was determined that it would be more cost effective to ship the slow cooker in its own container (SIOC) using USPS Priority Mail Express. The kitchen towels and porcelain mug are to be delivered using UPS Ground in separate containers: Box B936 and Bag 21A. This configuration was determined to be more cost effective than shipping the whole order in one large box.

The cartonization engine 118 provides several technical advantages over existing solutions for packaging items. The cartonization engine 118 is scalable to handle millions of requests per day. This is because it does not need to store item attribute data locally and can access needed information on an as-needed basis. Avoiding duplication of item attribute information enables the cartonization engine 118 to process requests more efficiently and quickly. In embodiments where a container cache 828 is utilized, the cartonization engine 118 only need to request container information when special instances occur or when new containers become available. This also enables the cartonization engine 118 to process requests more quickly and efficiently because commonly used information is readily available.

In some embodiments, responses to requests for cartonization can be returned in less than a second. In other embodiments, the requests can be processed in less than 500 milliseconds, less than 400 milliseconds, less than 300 milliseconds, less than 200 milliseconds, or less than 100 milliseconds. In some embodiments, as many as 1 million cartonization requests can be processed in a day. In some embodiments, as many as 2 million requests, as many as 3 million requests, as many as 4 million requests, as many as 5 million requests, or as many as 6 million requests can be processed in a day. In some instances, up to 10 million requests can be processed by the cartonization engine 118 in a single day for a given retail enterprise.

The cartonization engine 118 provides additional benefits in the form of cost savings for storing and shipping items. In addition to maximizing available space, the core logic 810 determines the least expensive way to store or ship a set of items. For example, logic for splitting orders into multiple containers can determine whether two smaller containers are less expensive to ship than one larger container and vice versa. Additionally, logic indicating when items can be shipped in bags and envelopes introduces significant cost savings by shipping more items in lighter packaging. Finally, logic determining when items can be nested inside one another maximizes all available space in such a way that taking account only overall item dimensions does not.

Finally, a specific advantage of the cartonization engine 118 is that it is customizable to particular retail store locations, containers, and items. Users can turn on and off business rules to suit their needs so that they are not constrained in all situations. Still further, due to integration with the overall shipment label generation process, the cartonization engine 118 provides for updated cartonization decisions based on changes in item selection, carrier, or carton availability at a particular time and location. This provides for a flexible and efficient tool to aid in the cartonization process.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A computer-implemented system for allocating items to containers, the system comprising:
   a processor; and
   a memory coupled to the processor and storing instructions that, when executed by the processor, cause the system to:
   receive an order at a first time, the order including one or more of a plurality of different items, the order being allocated to a node of a retail supply chain for fulfillment;
   select an initial delivery mode including a carrier selection, a type of carrier service selection, and a container selection, wherein selecting the initial delivery mode includes:
      retrieve item attribute data for the one or more of the plurality of different items from one or more item attribute information sources that are remote from the system and accessible using a first application programming interface, the item attribute data including volumes of the one or more of the plurality of different items;
      retrieve, from a locally stored cache comprising container attribute data for a plurality of different containers specific to the node, container attribute data for one or more containers of the plurality of different containers compatible with the carrier selection and the type of carrier service selection, the container attribute data including interior dimensions of the one or more containers;
      calculate a first volume of space required to contain the one or more of the plurality of different items based on the volumes of the one or more of the plurality of different items and a set of business rules specific to the node and defining compatibility of items and containers;
      calculate a second volume of space available in the one or more containers based on the interior dimensions of the one or more containers;
      determine which of the one or more of the plurality of different items to place into the one or more containers based on the first and second volumes and the set of business rules;
   display the initial delivery mode on a user interface;
   receive an order preparation confirmation at a second time subsequent to the first time and prior to generating a ship label and manifest, the order preparation confirmation indicating the one or more items of the order to be shipped have been gathered;
   in response to receiving the order preparation confirmation and prior to generating the ship label and manifest, re-evaluate the initial delivery mode including determining a change in the carrier selection or in the type of carrier service selection and select a final delivery mode based on the determined change, the final delivery mode including a final container selection and a final determination of which of the one or more of the plurality of different items to place into the final container selection based on the first and second volumes and the set of business rules;
   display the final delivery mode on the user interface;
   generate the ship label and manifest based on the final delivery mode; and
   a robot configured to receive the final container selection and to use the final container selection to retrieve an appropriate container to package the one or more items in the order.

2. The computer-implemented system of claim 1, wherein the determination displayed on the user interface includes a display of visual representations of the one or more of the plurality of different items determined to be placed into the one or more of the plurality of different containers.

3. The computer-implemented system of claim 1, wherein the node is a particular retail facility.

4. The computer-implemented system of claim 1, wherein the system uses a second application programming interface to facilitate communication with one or more consumers.

5. The computer-implemented system of claim 1, wherein the user interface is further configured to display a diagram illustrating how to place at least a portion of the one or more of the plurality of different items in each container of the one or more of the plurality of different containers.

6. The computer-implemented system of claim 1, wherein the instructions, when executed by the processor, further cause the system to determine an optimal delivery mode, the optimal delivery mode defining at least the node, at least one carrier, and at least one container to fulfill an online order within a given timeframe.

7. A computer-implemented method of maximizing an amount of items that are stored in a container, the method comprising:
   receiving an order at a first time, the order including plurality of items, the order being allocated to a node of a retail supply chain for fulfillment;
   selecting an initial delivery mode including a carrier selection, a type of carrier service selection, and a container selection, wherein selecting the initial delivery mode includes:
      obtaining, from a locally stored cache comprising container attribute data for a plurality of different containers specific to the node, container attributes for a container, the container being compatible with a carrier and a type of carrier service, and the container attributes including interior dimensions of the container;
      determining an available volume of the container;
      retrieving item attributes for the plurality of items from a remote item attribute information source that is accessible using an application programming interface, the item attributes comprising dimensions of the items;

determining optimal selection of one or more of the plurality of items to fill the available volume of the container;

outputting the initial delivery mode to a graphical user interface (GUI);

receiving an order preparation confirmation at a second time subsequent to the first time and prior to generating ship label and manifest, the order preparation confirmation indicating the items of the order have been gathered;

in response to receiving the order preparation confirmation and prior to generating the ship label and manifest, re-evaluating the initial delivery mode including determining a change in the carrier selection or in the type of carrier service selection and selecting a final delivery mode based on the determined change, the final delivery mode including a final container selection and a final optimal selection of one or more of the plurality of items to fill the available volume of the final container selection;

outputting the final delivery mode to the GUI;

generating the ship label and manifest based on the final delivery mode; and sending the final container selection to a robot that is configured to use the final container selection to retrieve an appropriate container to package the one or more items in the order.

8. The method of claim 7, wherein the container is a picking cart.

9. The method of claim 7, wherein the container is a temperature-controlled storage container or a climate-controlled storage container.

10. The method of claim 7, wherein the container attributes further comprise maximum weight that the container can hold.

11. The method of claim 7, wherein the item attributes further comprise item weight, packaging requirements, and fragility of items.

12. A computer-implemented method of minimizing an amount and expense of packaging for one or more items in a retail order, the method comprising:

receiving an order at a first time, the order including one or more items, the order being allocated to a node of a retail supply chain for fulfillment;

selecting an initial delivery mode including a carrier selection, a type of carrier service selection, and a container selection, wherein selecting the initial delivery mode includes:

obtaining item attributes for the one or more items from a remote item attribute information source that is accessible using an application programming interface, the item attributes comprising weight, dimensions, and packaging requirements of the items;

calculating, based on the item attributes, a minimum volume required to contain the one or more items and a total weight of the one or more items;

retrieving, from a locally stored cache comprising container attribute data for a plurality of containers specific to the node, container attributes for one or more of the plurality of containers compatible with a carrier and a type of carrier service, the container attributes comprising interior dimensions of the container and weight capacity of the container;

determining at least one container from the one or more of the plurality of containers that will contain the minimum volume and total weight of the one or more items and meet the packaging requirements of the one or more items;

outputting the at least one container to a graphical user interface (GUI);

receiving an order preparation confirmation at a second time subsequent to the first time and prior to generating a ship label and manifest, the order preparation confirmation indicating the items of the order have been gathered;

in response to receiving the order preparation confirmation, re-evaluating the initial delivery mode including determining a change in the carrier selection or in the type of carrier service selection and selecting a final delivery mode based on the determined change, the final delivery mode including a final container selection;

outputting the final delivery mode to the GUI;

generating the ship label and manifest based on the final delivery mode; and sending the final container selection to a robot configured to use the final container selection to retrieve an appropriate container to package the one or more items in the order.

13. The computer-implemented method of claim 12, further comprising:

displaying a diagram on the GUI indicating how to place the one or more items into the at least one container.

14. The computer-implemented method of claim 12, wherein the determining comprises calculating shipping costs for packaging the one or more items into the one or more of the plurality of containers.

15. The computer-implemented method of claim 14, wherein the determining further comprises ascertaining whether to split the one or more items of the order into two or more containers.

16. The computer-implemented method of claim 14, wherein the determining further comprises ascertaining whether the one or more items can be packaged into bags instead of boxes.

17. One or more non-transitory computer-readable media having computer-executable instructions embodied thereon that, when executed by one or more computing devices, cause the one or more computing devices to perform a method of arranging a set of items into one or more containers, the method comprising:

receiving at a first time, shipment details associated with an order that include item identifiers for items of the order, the order having been allocated to a node of a retail supply chain for fulfillment;

selecting an initial delivery mode including a carrier selection, a type of carrier service selection, and a container selection, wherein selecting the initial delivery mode includes:

fetching, from one or more remote item attribute information sources using a first application programming interface, item attribute information for the items represented by the item identifiers, the item attribute information comprising weights, dimensions, and packaging requirements of the items;

fetching, from a locally stored cache comprising container attribute data for a plurality of containers specific to the node, container attribute information for available containers of the plurality of containers that are compatible with the carrier selection and the type of carrier service selection, the container attribute information including weight capacity, volume capacity, and container type of the available containers;

generating stack sequence identifying one or more of the available containers to package the items, the stack sequence being generated to minimize empty space within each container and minimize cost of shipping;

mapping the stack sequence to the shipment details;

communicate the stack sequence through a second application programming interface to one or more consumers; and in response to receiving an order preparation confirmation at a second time subsequent to the first time and prior to generating a ship label and manifest, re-evaluating the initial delivery mode including determining a change in the carrier selection or in the type of carrier service selection and selecting a final deliver mode based on the determined change, the final delivery mode including a final container selection and a final stack sequence generated to minimize empty space within the final container selection;

generating the ship label and manifest based on the final delivery mode; and sending the final container selection to a robot configured to use the final container selection to retrieve an appropriate container to package the one or more items in the order.

18. The one or more non-transitory computer-readable media of claim 17, wherein the method further comprises saving the stack sequence in a database for cuboid combination.

* * * * *